(12) United States Patent
Mizutani et al.

(10) Patent No.: US 9,902,427 B2
(45) Date of Patent: Feb. 27, 2018

(54) PARKING ASSISTANCE DEVICE, PARKING ASSISTANCE METHOD, AND NON-TRANSITORY COMPUTER READABLE MEDIUM STORING PROGRAM

(71) Applicant: AISIN SEIKI KABUSHIKI KAISHA, Kariya-shi, Aichi-ken (JP)

(72) Inventors: Yuichi Mizutani, Chita-gun (JP); Shogi Fukukawa, Nagoya (JP); Masaya Kato, Toyokawa (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/223,138

(22) Filed: Jul. 29, 2016

(65) Prior Publication Data
US 2017/0029027 A1    Feb. 2, 2017

(30) Foreign Application Priority Data

Jul. 31, 2015 (JP) ................. 2015-151616

(51) Int. Cl.
*B62D 15/02* (2006.01)
*B62D 6/00* (2006.01)

(52) U.S. Cl.
CPC ......... *B62D 15/0285* (2013.01); *B62D 6/002* (2013.01)

(58) Field of Classification Search
CPC ............................. B62D 15/0285; B62D 6/002
USPC .............................................. 701/41
See application file for complete search history.

(56) References Cited

U.S. PATENT DOCUMENTS

2007/0198152 A1* 8/2007 Endo .................. G08G 1/161
                                                    701/41

FOREIGN PATENT DOCUMENTS

| DE | 10 2009 000 726 A1 | 8/2010 |
|----|-----|-----|
| JP | 2004-338638 A | 12/2004 |
| JP | 2004338638 A * | 12/2004 |
| JP | 2008-201177 A | 9/2008 |
| JP | 2013-126868 A | 6/2013 |
| WO | 2005/007490 A1 | 1/2005 |

OTHER PUBLICATIONS

EPO English translation of JP 2004/338638.*
Communication dated Jan. 2, 2017 from the European Patent Office in counterpart Application No. 16181840.6.

* cited by examiner

*Primary Examiner* — Yazan A Soofi
(74) *Attorney, Agent, or Firm* — Sughrue Mion, PLLC

(57) ABSTRACT

A parking assistance device includes: a setting unit that sets a movement route of a vehicle with an electric power steering when parking assistance is activated in the vehicle; a generation unit that generates control data equivalent to a changed steering angle curve which has taken into consideration a response delay between the output steering angle of the electric power steering and an actual tire angle in advance, based on the set movement route; and a control unit that controls the electric power steering based on the control data.

11 Claims, 17 Drawing Sheets

PARKING ASSISTANCE DEVICE, PARKING ASSISTANCE METHOD, AND NON-TRANSITORY COMPUTER READABLE MEDIUM STORING PROGRAM

CROSS REFERENCE TO RELATED APPLICATIONS

This application is based on and claims priority under 35 U.S.C. § 119 to Japanese Patent Application 2015-151616, filed on Jul. 31, 2015, the entire contents of which are incorporated herein by reference.

TECHNICAL FIELD

An embodiment of this disclosure relates to a parking assistance device, a parking assistance method, and a program.

BACKGROUND DISCUSSION

Technology, which provides a driver with image data of the surrounding environment of a vehicle which is captured by a plurality of cameras installed on the vehicle, is proposed to assist the driver in parking the vehicle. Technology proposed at this time assists the driver in parking the vehicle by performing steering control based on a predicted movement locus or the like which is obtained in a case where the movement of the vehicle at steering angles is to be made.

An example of related art includes JP 2013-126868A.

In a configuration illustrated in FIG. 16, when steering control is performed based on a predicted movement locus in the related art, a route, which corresponds to steering angles at which unnecessary reverse turning of an electric power steering is not required when driving to a target parking position, is set as a target route RTXR, and the steering angle of the electric power steering is set to correspond to the set target route RTXR.

Accordingly, if a response delay between the steering angle of the electric power steering and an actual tire angle occurs, an actual route (movement route RTXRP) illustrated by a solid line is obtained with respect to the target route RTXR illustrated by a dotted line, and the number of times of the reverse turning of the electric power steering, which is not originally required, may increase, which is a problem.

SUMMARY

Thus, a need exists for a parking assistance device, a parking assistance method, and a program which are not suspectable to the drawback mentioned above.

A parking assistance device according to an aspect of this disclosure includes: a setting unit that sets a movement route of a vehicle with an electric power steering when parking assistance is activated in the vehicle; a generation unit that generates control data equivalent to a changed steering angle curve which has taken into consideration a response delay between the output steering angle of the electric power steering and an actual tire angle in advance, based on the set movement route; and a control unit that controls the electric power steering based on the control data.

A method according to another aspect of this disclosure is executed by a parking assistance device that assists a driver in parking a vehicle with an electric power steering, the method including the steps of: setting a movement route of the vehicle when the parking assistance is activated; generating control data equivalent to a changed steering angle curve which has taken into consideration a response delay between the output steering angle of the electric power steering and an actual tire angle in advance, based on the set movement route; and controlling the electric power steering based on the control data.

A program according to still another aspect of this disclosure causes a computer to control a parking assistance device that assists a driver in parking a vehicle with an electric power steering, the program causing the computer to serve as means for setting a movement route of the vehicle when parking assistance is activated; means for generating control data equivalent to a changed steering angle curve which has taken into consideration a response delay between the output steering angle of the electric power steering and an actual tire angle in advance, based on the set movement route; and means for controlling the electric power steering based on the control data.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment will be disclosed. The configuration of the embodiment described hereinafter and actions, results, and effects brought by the configuration are merely examples. This disclosure can also be realized by a configuration other than the configuration disclosed in the embodiment described hereinafter. At least one of various effects and derivative effects based on the basic configuration can be obtained.

For example, a vehicle 1 in the embodiment may be a vehicle equipped with an internal combustion engine (not illustrated) as a drive source, that is, may be an internal combustion engine vehicle. The vehicle 1 may be a vehicle equipped with an electric motor (not illustrated) as a drive source, that is, may be an electric vehicle, a fuel cell vehicle, or the like. The vehicle 1 may be a hybrid vehicle equipped with both an internal combustion engine and an electric motor as drive sources. Alternatively, the vehicle 1 may be a vehicle equipped with another drive source. Various transmissions can be mounted on the vehicle 1. Various devices such as systems or components required to drive an internal combustion engine or an electric motor can be mounted on the vehicle 1. The type, number, and layout of devices relating to driving vehicle wheels 3 of the vehicle 1 can be set in various forms.

Figure 1:
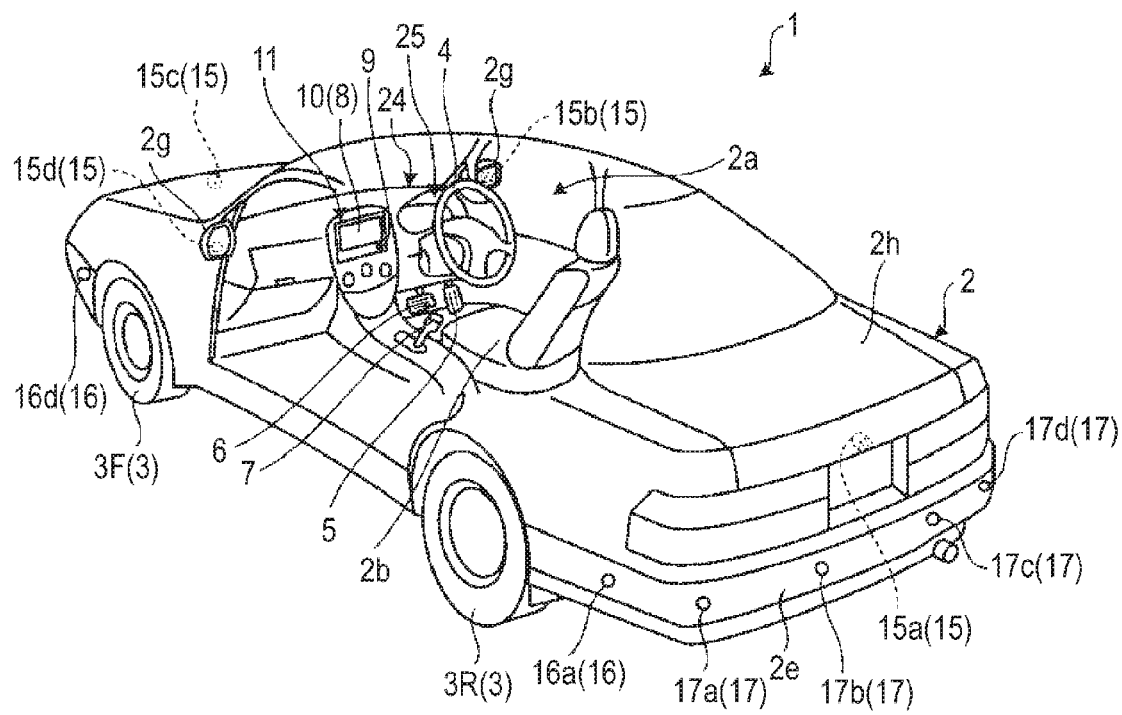
FIG. 1 is an exemplary perspective view in which a portion of a passenger compartment of a vehicle in embodiments is seen in perspective.

FIG. 1 is an exemplary perspective view in which a portion of a passenger compartment of the vehicle in the embodiment is seen in perspective.

Figure 2:
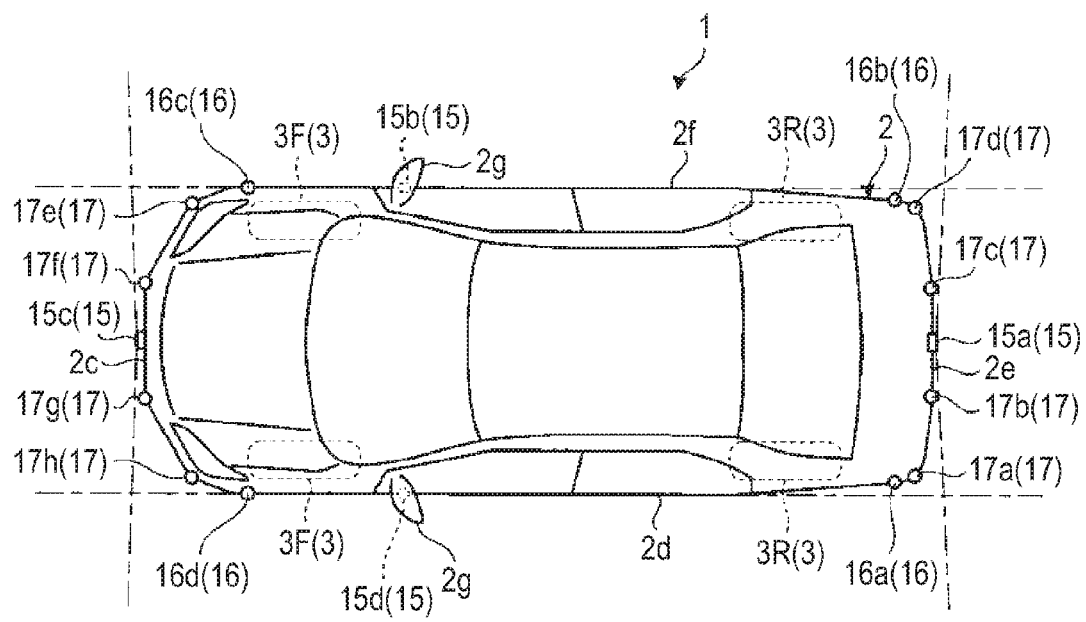
FIG. 2 is an exemplary plan view (bird's-eye view) of the vehicle in the embodiments.

FIG. 2 is an exemplary plan view (bird's-eye view) of the vehicle in the embodiment.

As illustrated in FIG. 1, a vehicle body 2 forms a passenger compartment 2a in which occupants (not illustrated) are seated. A steering section 4, an acceleration operation section 5, a brake operation section 6, a shift operation section 7, and the like are provided inside the passenger compartment 2a in a state where these sections are disposed in the vicinity of a seat 2b of a driver who is an occupant.

For example, the steering section 4 is a steering wheel that protrudes from a dashboard 24. The acceleration operation section 5 is an accelerator pedal positioned under the feet of the driver. The brake operation section 6 is a brake pedal positioned under the feet of the driver. The shift operation section 7 is a shift lever that protrudes from a center console. The steering section 4, the acceleration operation section 5, the brake operation section 6, and the shift operation section 7 are not limited to those components described above.

In addition, a display device 8 which is a display output unit and a voice output device 9 which is a voice output unit are provided inside the passenger compartment 2a. The display device 8 is a liquid crystal display (LCD), an organic electroluminescence display (OELD), or the like. The voice output device 9 is a speaker or the like. The display device 8 is covered with a transparent operation input unit 10 such as a touch panel. An occupant can observe an image displayed on a display screen of the display device 8 via the operation input unit 10. An occupant can execute an input operation by touching, pressing or moving a portion of the operation input unit 10, which is positioned to correspond to an image displayed on the display screen of the display device 8, with a finger. The display device 8, the voice output device 9, the operation input unit 10, and the like are provided in a monitor device 11 that is positioned in a central portion of the dashboard 24 in a lateral direction of the vehicle, that is, a rightward and leftward direction. The monitor device 11 may include operation input units (not illustrated) such as switches, dials, joysticks, and pressable buttons. A voice output device (not illustrated) may be provided inside the passenger compartment 2a at a position different from the position of the monitor device 11. The voice output device different from the voice output device 9 of the monitor device 11 may output voices. The monitor device 11 can be also used as a navigation system, an audio system, or the like.

A display device 12 (refer to FIG. 3) which is different from the display device 8 is provided inside the passenger compartment 2a.

Figure 3:
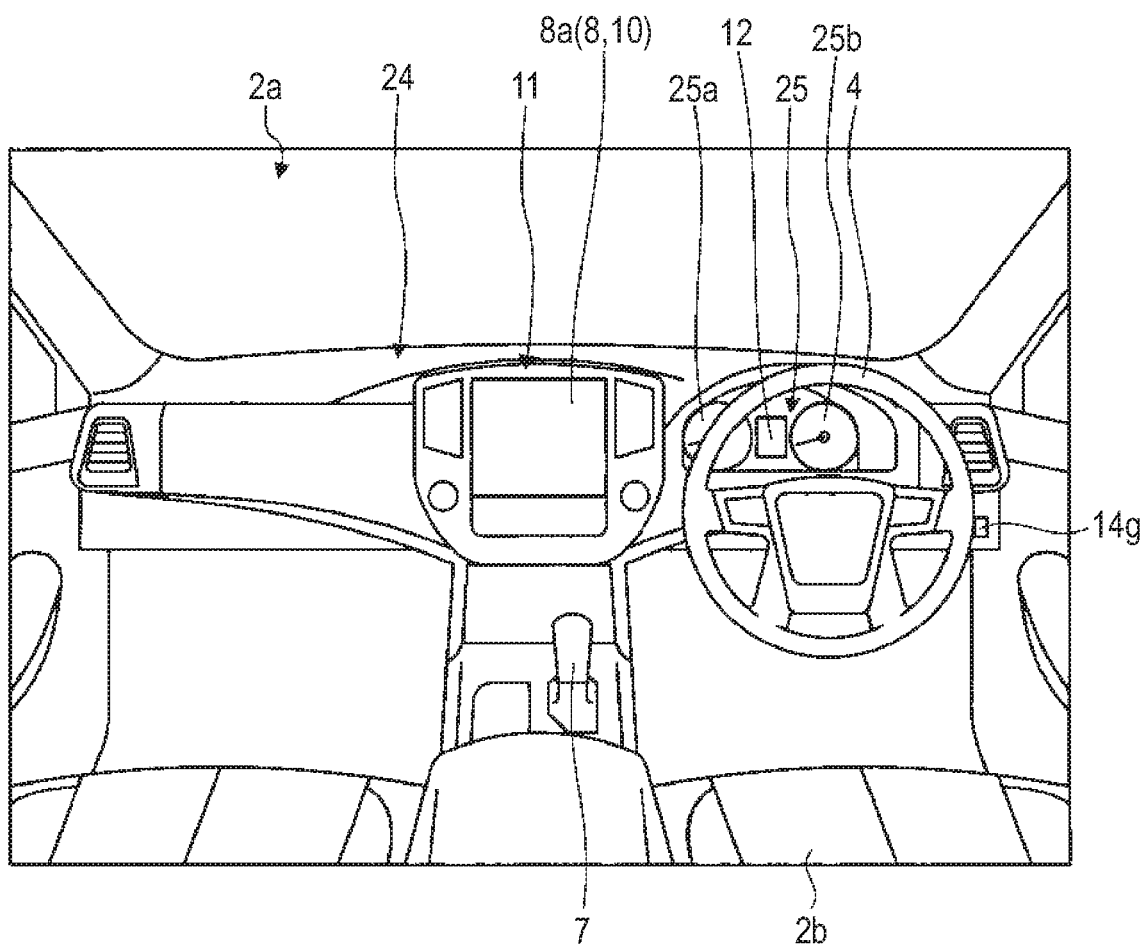
FIG. 3 is a view illustrating an example of a dashboard of the vehicle in the embodiments which is seen from the rear side of the vehicle.

FIG. 3 is a view illustrating an example of the dashboard of the vehicle in the embodiment which is seen from the rear side of the vehicle.

As illustrated in FIG. 3, the display device 12 is provided in an instrument panel section 25 of the dashboard 24, and is positioned between a speed display section 25a and a rotational speed display section 25b at substantially the center of the instrument panel section 25. The size of a screen of the display device 12 is smaller than the size of a screen (refer to FIG. 1) of the display device 8. The display device 12 is capable of displaying images indicating information mainly regarding assisting the driver in parking the vehicle 1. The amount of information displayed on the display device 12 may be less than the amount of information displayed on the display device 8. The display device 12 is a LCD, an OELD, or the like. The display device 8 may display information that has been displayed on the display device 12.

As illustrated in FIGS. 1 and 2, for example, the vehicle 1 is a four wheel drive vehicle, and includes two right and left front wheels 3F, and two right and left rear wheels 3R. The four vehicle wheels 3 are configured such that any one of the four vehicle wheels 3 can be turned.

Figure 4:
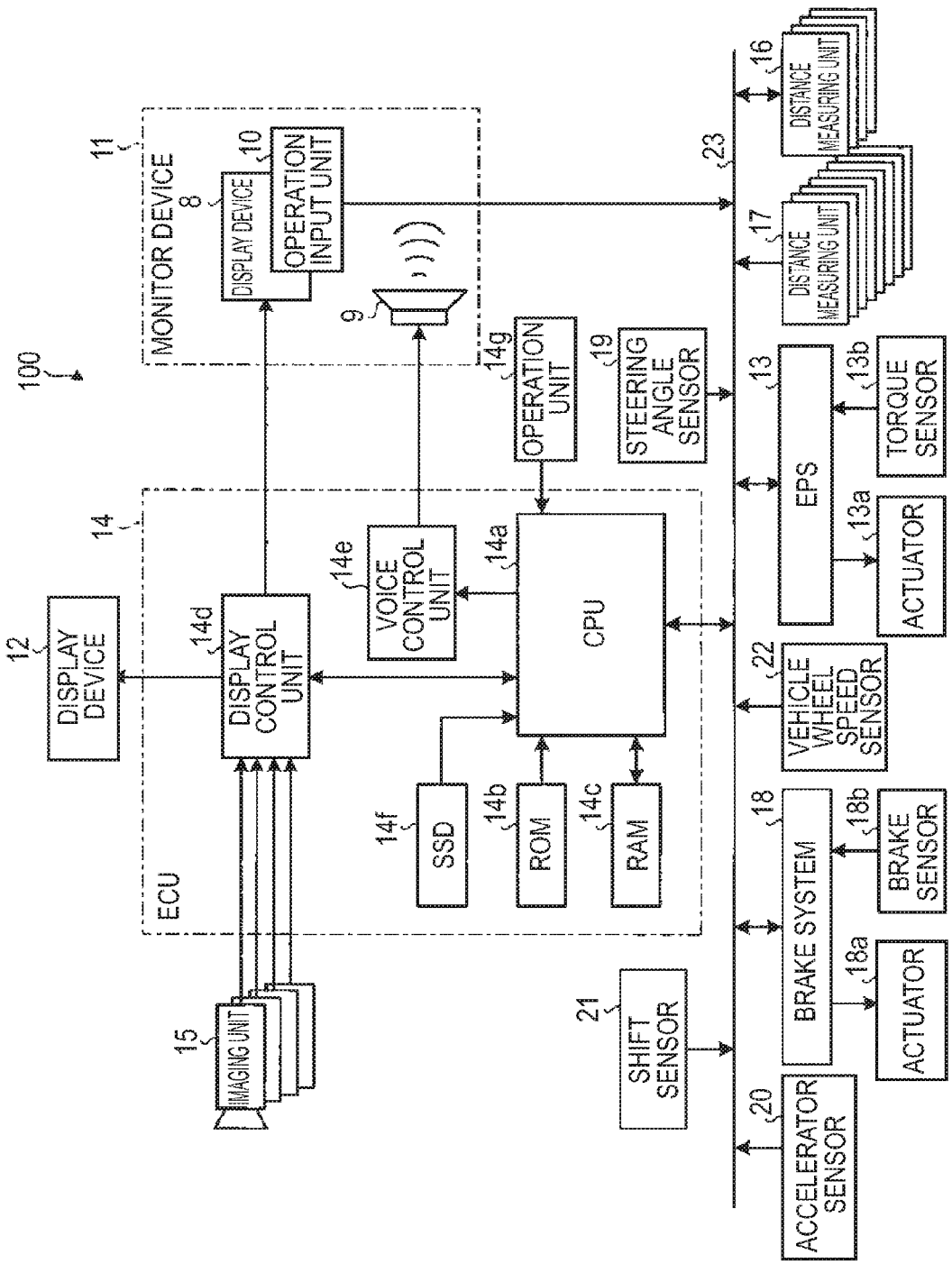
FIG. 4 is an exemplary block diagram of the configuration of a parking assistance system in the embodiments.

FIG. 4 is an exemplary block diagram of the configuration of a parking assistance system in the embodiment.

As illustrated in FIG. 4, the vehicle 1 includes an electric power steering system (hereinafter, simply referred to as an EPS) 13 that steers at least two vehicle wheels 3. The EPS 13 includes an actuator 13a and a torque sensor 13b. The EPS 13 is electrically controlled by an electronic control unit (ECU) 14 or the like such that the actuator 13a is operated. In the following description, the EPS 13 is an electric power steering system, a steer by wire (SBW) system, or the like. The EPS 13 complements a steering force by adding torque, that is, assisted torque to the steering section 4 using the actuator 13a, or turns the vehicle wheels 3 using the actuator 13a. In this case, the actuator 13a may turn one vehicle wheel 3, or may steer a plurality of the vehicle wheels 3. For example, the torque sensor 13b detects torque that is applied to the steering section 4 by the driver.

As illustrated in FIG. 2, for example, four imaging units 15a to 15d which are a plurality of imaging units 15 are provided on the vehicle body 2. Each of the imaging units 15 is a digital camera with a built-in imaging element such as a charge coupled device (CCD) or a CMOS image sensor (CIS). Each of the imaging units 15 is capable of outputting moving image data at a predetermined frame rate. Each of the imaging units 15 includes a wide-angle lens and a fish-eye lens, and for example, is capable of capturing an image of a surrounding area in a range of 140° to 190° in a horizontal direction. The optical axis of each of the imaging units 15 is set to extend obliquely downward. Accordingly, each of the imaging units 15 sequentially captures images of an external environment around the vehicle body 2, which contains road surfaces on which the vehicle 1 is capable of moving, or areas where the vehicle 1 can be parked, and each of the imaging units 15 outputs captured image data.

For example, the imaging unit 15*a* is positioned at a rear end portion 2*e* of the vehicle body 2, and is provided on a lower wall portion of a door 2*h* of a rear trunk. For example, the imaging unit 15*b* is positioned at a right end portion 2*f* of the vehicle body 2, and is provided on a right rear view mirror 2*g*. For example, the imaging unit 15*c* is positioned at an end portion 2*c* on the front side of the vehicle body 2, that is, the front side of the vehicle body 2 in a forward and rearward direction of the vehicle, and is provided on a front bumper or the like. For example, the imaging unit 15*d* is positioned at an end portion 2*d* on the left side of the vehicle body 2, that is, the left side of the vehicle body 2 in the lateral direction of the vehicle, and is provided on a left rear view mirror 2*g* which is a protrusion. The ECU 14 is capable of generating a wider angle image, or generating a virtual bird's-eye view image of the vehicle 1, which is viewed from the top, by executing computational processes or image processing of image data obtained by the plurality of imaging units 15. A bird's-eye view image is referred to as a planar image.

The ECU 14 identifies stall lines or the like, which are marked on road surfaces around the vehicle 1, in images captured by the imaging units 15, and detects (extracts) parking stalls marked by stall lines.

As illustrated in FIGS. 1 and 2, for example, four distance measuring units 16*a* to 16*d* and eight distance measuring units 17*a* to 17*h* which are a plurality of distance measuring units 16 and 17 are provided on the vehicle body 2. For example, the distance measuring units 16 and 17 are sonars that emit ultrasonic waves and capture reflected waves. A sonar is also referred to as a sonar sensor or an ultrasonic detector. The ECU 14 is capable of identifying the presence of an object such as an obstacle positioned around the vehicle 1, and measuring the distance from the vehicle 1 to the object, based on results of detection by the distance measuring units 16 and 17. That is, the distance measuring units 16 and 17 are examples of a detection unit that detects objects. For example, each of the distance measuring units 17 is used to detect an object positioned a relatively short distance away therefrom. Compared to the distance measuring units 17, each of the distance measuring units 16 is used to detect an object positioned far away therefrom, that is, positioned a relatively long distance therefrom. The distance measuring units 17 are used to detect objects in front and back of the vehicle 1. The distance measuring units 16 are used to detect objects besides the vehicle 1.

As illustrated in FIG. 4, in the parking assistance system 100, in addition to the ECU 14, the monitor device 11, the EPS 13, the distance measuring units 16 and 17, and the like, a brake system 18, a steering angle sensor 19, an accelerator sensor 20, a shift sensor 21, and a vehicle wheel speed sensor 22 are electrically connected to each other via an in-vehicle network 23 which is a telecommunication line.

For example, the in-vehicle network 23 is configured as a controller area network (CAN). The ECU 14 is capable of controlling the EPS 13, the brake system 18, or the like by sending control signals via the in-vehicle network 23 thereto. Via the in-vehicle network 23, the ECU 14 is capable of receiving results of detection by the torque sensor 13*b*, the brake sensor 18*b*, the steering angle sensor 19, the distance measuring units 16, the distance measuring units 17, the accelerator sensor 20, the shift sensor 21, the vehicle wheel speed sensor 22, and the like, or operation signals from the operation input unit 10 and the like.

As illustrated in FIG. 4, the ECU 14 includes a central processing unit (CPU) 14*a*; a read only memory (ROM) 14*b*; a random access memory (RAM) 14*c*; a display control unit 14*d*; a voice control unit 14*e*; a solid state drive (SSD) (flash memory) 14*f*; and the like.

The CPU 14*a* is capable of executing various computational processes and controls such as the processing of images displayed on the display devices 8 and 12, the determination of a movement target position of the vehicle 1, the computing of a movement route of the vehicle 1, a determination as to whether or not the vehicle 1 interferes with an object, automatic control of the vehicle 1, and the releasing of automatic control. The CPU 14*a* is capable of reading a program installed and stored in a non-volatile storage device such as the ROM 14*b*, and executing calculations according to the program.

The RAM 14*c* temporarily stores various data which is used in computations performed by the CPU 14*a*. Among the computational processes performed by the ECU 14, the display control unit 14*d* mainly executes image processing of image data obtained by the imaging units 15, and the composition of image data to be displayed on the display devices 8 and 12. Among the computational processes performed by the ECU 14, the voice control unit 14*e* mainly executes processing of voice data output from the voice output device 9. The SSD 14*f* is a rewritable non-volatile storage unit, and is capable of storing data even if a power supply of the ECU 14 is turned off.

The CPU 14*a*, the ROM 14*b*, the RAM 14*c*, and the like are integrated into one package. Instead of the CPU 14*a*, the ECU 14 may be configured to include another logical processor such as a digital signal processor (DSP), or a logic circuit. A hard disk drive (HDD) may be provided instead of the SSD 14*f*. The SSD 14*f* and a HDD may be provided separately from the ECU 14.

The brake system 18 is an anti-lock brake system (ABS) that prevents locking of the brakes, an electronic stability control (ESC) that prevents skidding of the vehicle 1 during cornering, an electric brake system that enhances braking force (executes braking assist), a brake by wire (BBW), or the like. The brake system 18 applies braking force to the vehicle wheels 3, and eventually to the vehicle 1 via an actuator 18*a*.

The brake system 18 is capable of detecting locking of the brakes, slipping of the vehicle wheels 3, or signs of skidding from a difference between the rotational speeds of the right and left vehicle wheels 3, and executing various controls. For example, the brake sensor 18*b* is a sensor that detects the position of a movable portion of the brake operation section 6. The brake sensor 18*b* is capable of detecting the position of the brake pedal which is a movable portion of the brake operation section 6. The brake sensor 18*b* includes a displacement sensor.

The steering angle sensor 19 is a sensor that detects the amount of steering of the steering section 4 such as a steering wheel. The steering angle sensor 19 is configured to include a hall element or the like. The ECU 14 acquires the amount of steering of the steering section 4 performed by the driver, or the amount of steering of each vehicle wheel 3 during automatic steering from the steering angle sensor 19, and executes various controls. The steering angle sensor 19 detects the rotational angle of a rotating part of the steering section 4. The steering angle sensor 19 is an example of an angle sensor.

For example, the accelerator sensor 20 is a sensor that detects the position of a movable portion of the acceleration operation section 5. The accelerator sensor 20 is capable of detecting the position of the accelerator pedal which is a movable portion of the acceleration operation section 5. The accelerator sensor 20 includes a displacement sensor.

For example, the shift sensor 21 is a sensor that detects the position of a movable portion of the shift operation section 7. The shift sensor 21 is capable of detecting the position of a lever, an arm, a button, or the like which is a movable portion of the shift operation section 7. The shift sensor 21 may include a displacement sensor, or may be configured as a switch.

The vehicle wheel speed sensor 22 is a sensor that detects the amount of rotation, or revolutions per unit time of the vehicle wheel 3. The vehicle wheel speed sensor 22 outputs the number of wheel speed pulses as a sensor value which indicates the detected revolutions. The vehicle wheel speed sensor 22 is configured to include a hall element or the like. The ECU 14 computes the amount of movement of the vehicle 1 based on the sensor value acquired from the vehicle wheel speed sensor 22, and executes various controls. In some cases, the vehicle wheel speed sensor 22 may be provided in the brake system 18. In this case, the ECU 14 acquires results of detection by the vehicle wheel speed sensor 22 via the brake system 18.

The configuration, the arrangement, and the electrical connection form of various sensors and the actuators described above are merely examples, and can be set (changed) in various forms.

In the embodiment, the ECU 14 realizes at least a portion of functions of the parking assistance device via collaboration between hardware and software (control program).

1. First Embodiment

Figure 5:
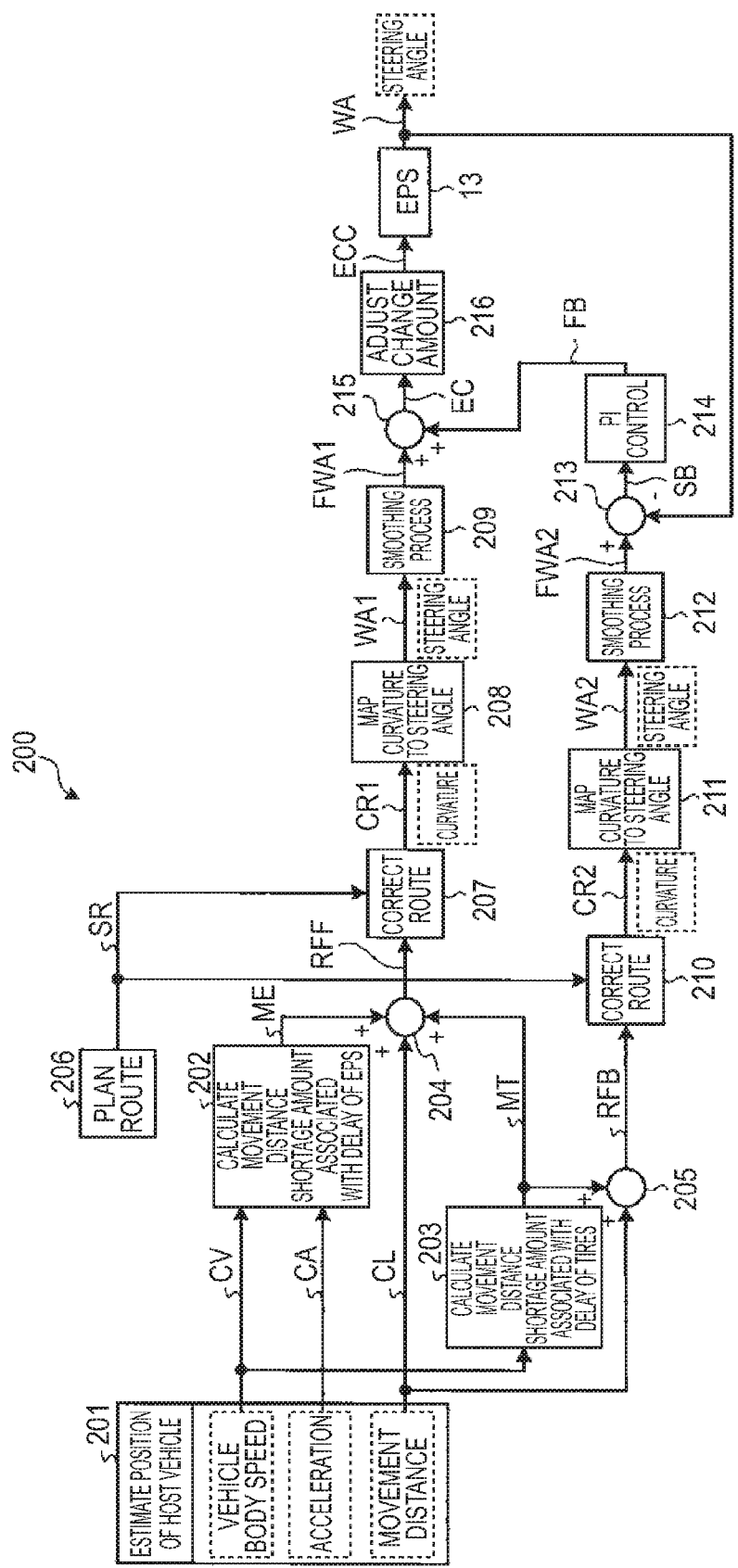
FIG. 5 is a block diagram illustrating the functional configuration of an EPS control function of an ECU in a first embodiment.

FIG. 5 is a block diagram illustrating the functional configuration of an EPS control function of an ECU in a first embodiment.

As illustrated in FIG. 5, an EPS control function 200 of the ECU 14 in the first embodiment includes a host vehicle position estimating unit 201 that outputs a vehicle body speed CV, vehicle body acceleration CA, and a travel distance (movement distance of the vehicle while parking assistance is activated) CL when parking assistance is activated; an EPS delay-associated movement distance calculating unit 202 that calculates a movement distance shortage amount ME associated with an EPS delay caused by a time lag in the operation of the EPS 13, based on the vehicle body speed CV and the vehicle body acceleration CA; a tire delay-associated movement distance calculating unit 203 that calculates a movement distance shortage amount MT associated with a tire delay caused by a time lag in an operation of changing the direction of the tires, based on the vehicle body speed CV; and a first addition unit 204 that adds the movement distance shortage amount ME and the movement distance shortage amount MT to the movement distance CL, and outputs the result as route correction feedforward data RFF.

The EPS control function 200 includes a second addition unit 205 that adds the movement distance shortage amount MT to the movement distance CL, and outputs the result as route correction feedback data RFB; a route planning unit 206 that sets a movement route of the vehicle 1 when parking assistance is activated, and outputs the movement route as set movement route data SR; a first route correcting unit 207 that corrects the set movement route data SR based on the route correction feedforward data RFF, and outputs the result as first corrected route data CR1; a first curvature/ steering angle map 208 that outputs first steering angle data WA1 which is steering angles into which the curvature of a route corresponding to the first corrected route data CR1 is converted; and a smoothing processing unit 209 which performs a smoothing process (low-pass filtering process) such that steering angle changes according to the first steering angle data WA1 are smoothed, and which outputs first smoothed steering angle data FWA1.

The EPS control function 200 includes a second route correcting unit 210 that corrects the set movement route data SR based on the route correction feedback data RFB, and outputs the result as second corrected route data CR2; a second curvature/steering angle map 211 that outputs second steering angle data WA2 which is steering angles into which the curvature of a route corresponding to the second corrected route data CR2 is converted; and a smoothing processing unit 212 which performs a smoothing process (low-pass filtering process) such that steering angle changes according to the second steering angle data WA2 are smoothed, and which outputs second smoothed steering angle data FWA2.

The EPS control function 200 includes a subtraction unit 213 that calculates and outputs a deviation SB between the second smoothed steering angle data FWA2 and steering angle data WA that is actually output by the EPS 13; a PI control unit 214 that generates and outputs feedback data FB for performing PI (proportional-integral) control on the steering angle data WA, based on the deviation SB; a third addition unit 215 that adds the feedback data FB to the first smoothed steering angle data FWA1, and outputs the result as EPS control data EC; and a change amount adjusting unit 216 which adjusts the amount of change of the EPS control data EC so as to suppress sharp steering angle changes such that the changes of the EPS control data EC do not cause deterioration in riding quality of occupants (including a driver) of the host vehicle, and which outputs adjusted EPS control data ECC to the EPS 13.

Hereinafter, an operation in the first embodiment will be described.

Figure 6:
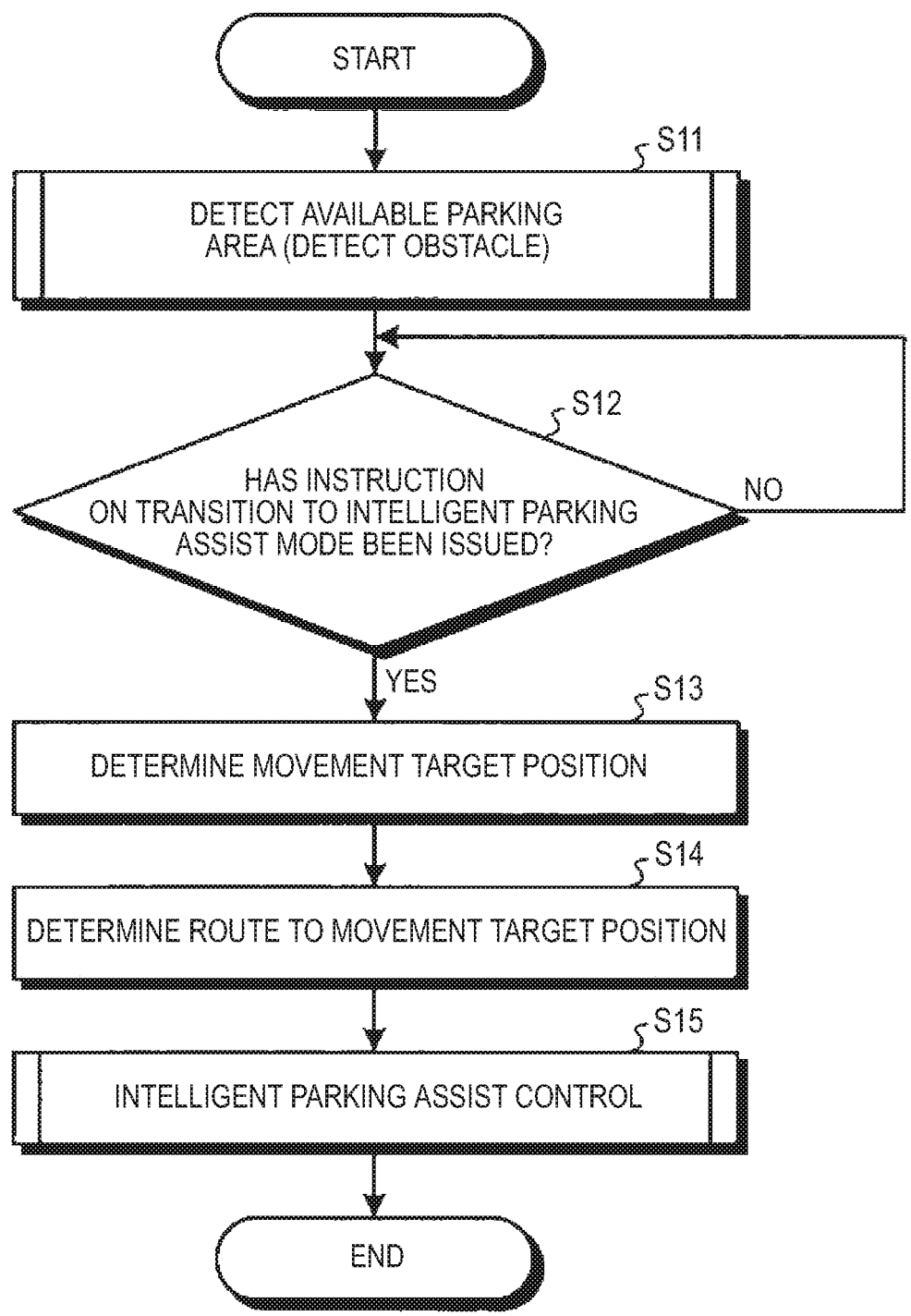
FIG. 6 is a flowchart outlining a process in the embodiments.

FIG. 6 is a flowchart outlining a process in the embodiment.

For example, an operation to be described in the first embodiment is driving forward guidance and perpendicular reverse parking.

First, the ECU 14 detects available parking areas (detects obstacles) (Step S11).

Figure 7:
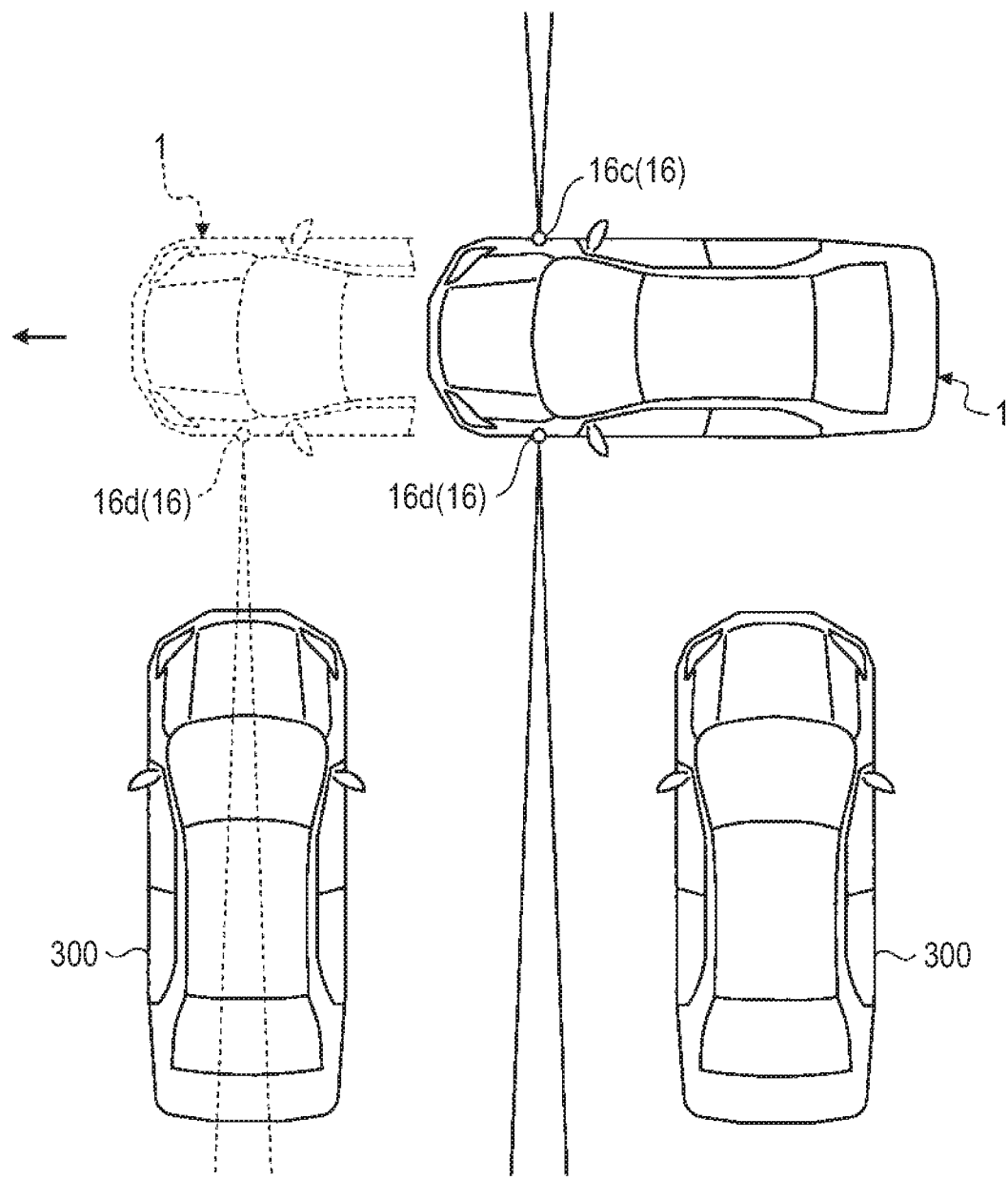
FIG. 7 is a view illustrating the detection of available parking areas in the embodiments.

FIG. 7 is a view illustrating the detection of available parking areas.

Figure 8:
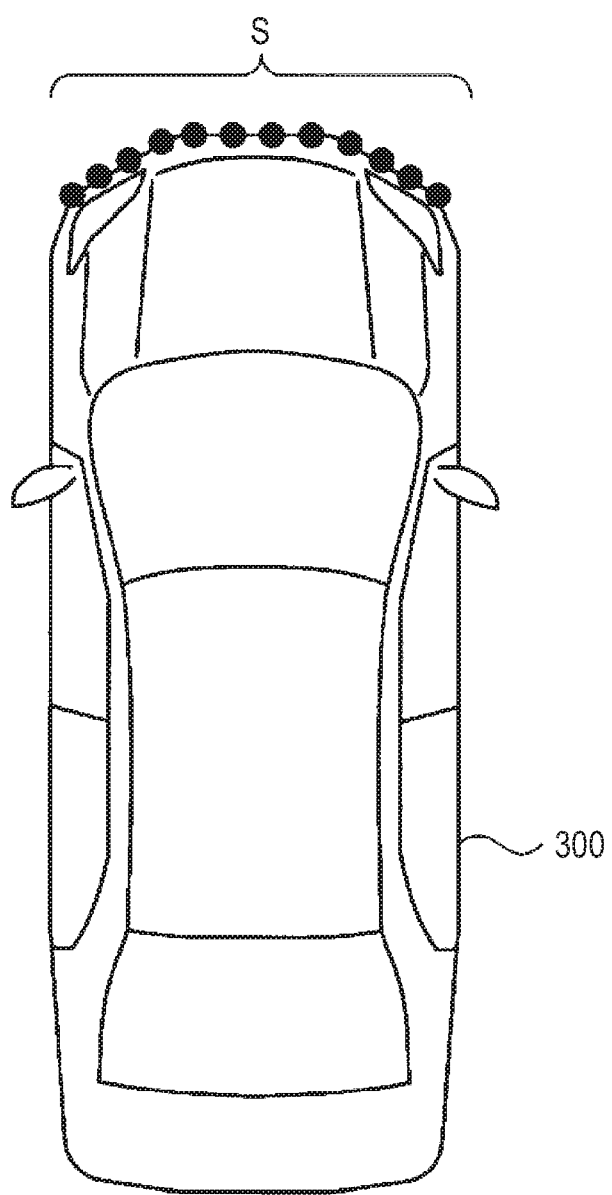
FIG. 8 is a view illustrating a reflective portion of an obstacle.

FIG. 8 is a view illustrating a reflective portion of an obstacle.

Specifically, distance measuring units 16c and 16d calculate the distances to obstacles such as other vehicles 300 at predetermined sampling timings, and output the calculated distances as data that corresponds to reflective portions S (each of which is an aggregation of reflection points at which sound waves or the like are reflected) of the obstacles. For example, the RAM 14c stores the output data at output intervals.

The ECU 14 independently detects available parking areas 301 (refer to FIG. 9) positioned on both the right and the left sides of the vehicle 1, based on the output data of the distance measuring units 16c to 16d.

Hereinafter, for purpose of easy understanding, a method of detecting an available parking area 301 on the left side of the vehicle 1 will be described.

Figure 9:
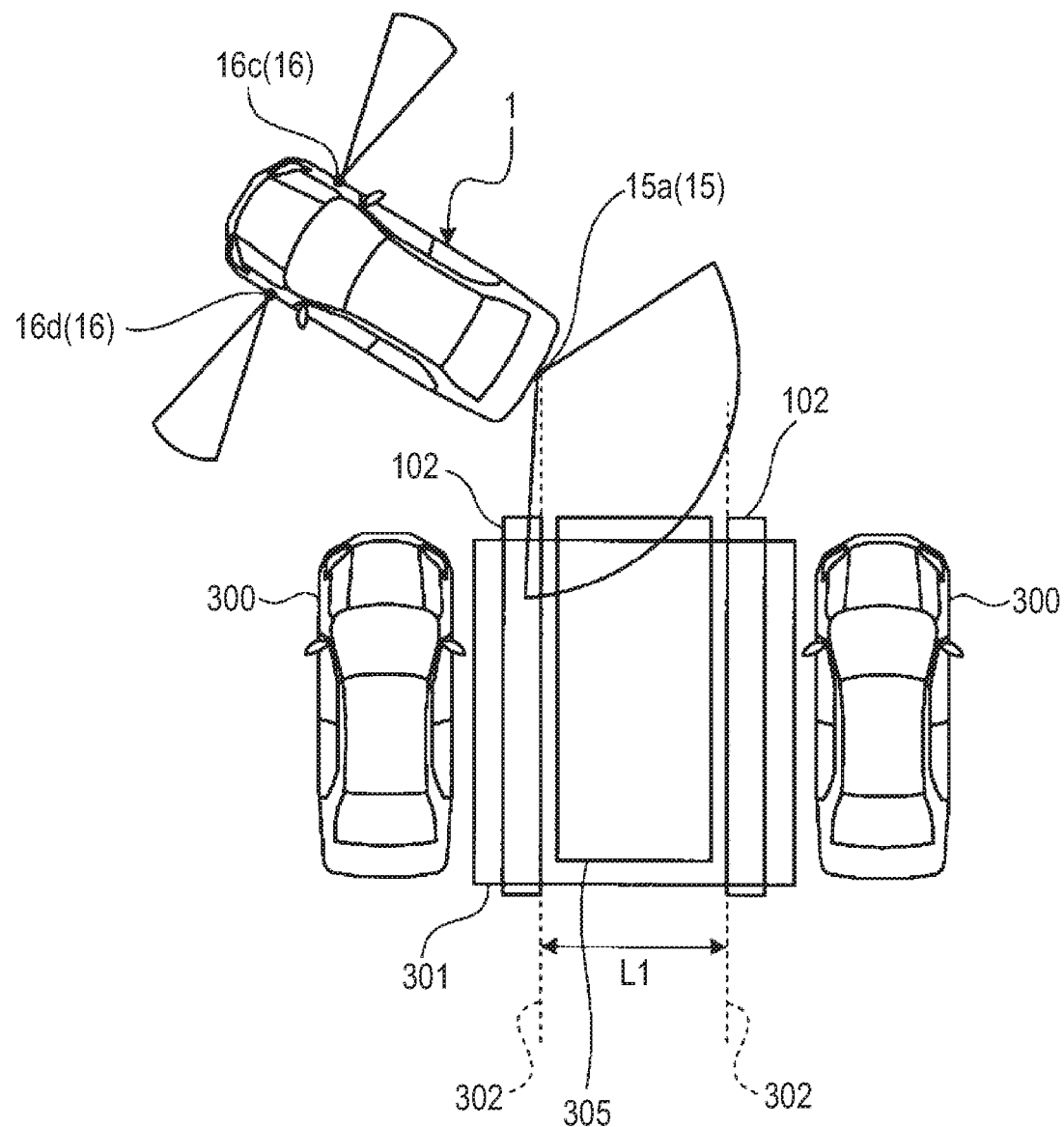
FIG. 9 is a view illustrating an available parking area.

FIG. 9 is a view illustrating an available parking area.

If output data corresponding to an obstacle has been output for a first predetermined length of time or longer, and thereafter, output data corresponding to the non-presence of an obstacle having the minimum required width of a parking area available for the vehicle 1 (including a case in which the distance to the obstacle is greater than or equal to a length in the forward and rearward direction of the vehicle, which is required to park the vehicle) has been output for a second predetermined length of time or longer, the ECU 14 determines that the available parking area 301 is present.

The ECU 14 detects parking stall lines 102 such as white lines which are provided on a traveling surface such as the ground or a road surface, based on captured image data output from the imaging unit 15a that captures images of the rear side of the vehicle 1. If described in more detail, the ECU 14 detects the parking stall lines 102 by performing edge extraction on captured image data that is output from the imaging units 15a to 15d during backward movement, forward movement, or stopping of the vehicle 1.

Subsequently, the ECU 14 determines whether an instruction on transition to an parking assistance mode has been issued via the operation unit 14g (Step S12).

In a case where it is determined in Step S12 that an instruction on transition to the parking assistance mode has not yet been issued via the operation unit 14g (Step S12: No), the ECU 14 enters a standby mode.

In a case where it is determined in Step S12 that an instruction on transition to the parking assistance mode has been issued via the operation unit 14g (Step S12: Yes), the ECU 14 serves as the route planning unit 206 to determine a movement target position (target parking position) 305 of the vehicle 1 (Step S13).

Subsequently, the ECU 14 serves as the route planning unit 206, sets a target route RTX of the vehicle 1 to the movement target position 305, and outputs the set movement route data SR to the first route correcting unit 207 and the second route correcting unit 210 (Step S14).

Figure 10:
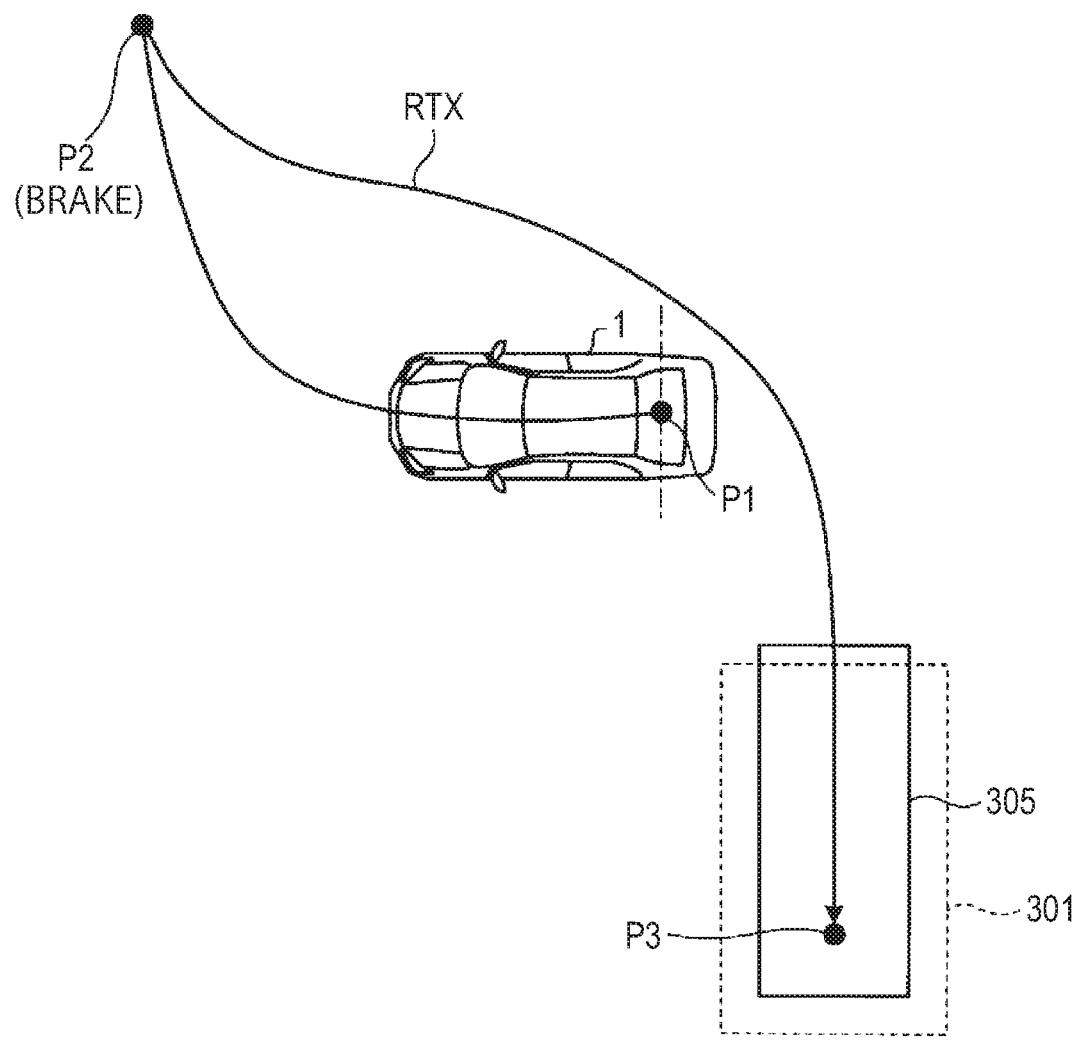
FIG. 10 is a view illustrating an example of the setting of a movement route.

FIG. 10 is a view illustrating an example of the setting of a movement route.

In FIG. 10, for purpose of easy understanding, a case in which a movement route contains one reverse turning position of the steering wheel (the steering section 4) will be described.

The target route RTX illustrated in FIG. 10 is formed such that a driver drives the vehicle 1 forward toward a reverse turning position P2 of the steering wheel (the steering section 4) while turning the steering wheel (the steering section 4) right by a predetermined amount from an initial position P1 (corresponding to the position of a central point of the axle of the rear wheels 3R) when a parking assistance control process of the vehicle 1 is started, stops the vehicle 1 by pressing the brakes (the brake operation section 6) at the reverse turning position P2, changes a gear position to a reverse position, and turns the steering wheel (the steering section 4) left toward the movement target position (target parking position) 305.

For example, control is performed such that the position of the central point of the axle of the rear wheels 3R reaches a movement target point P3 inside the movement target position (target parking position) 305.

In contrast, the ECU 14 serves as the host vehicle position estimating unit 201 to output the vehicle body speed CV, the vehicle body acceleration CA, and the travel distance (movement distance of the vehicle while parking assistance is activated) CL when parking assistance is activated.

Subsequently, the ECU 14 serves as the EPS delay-associated movement distance calculating unit 202 to calculate the movement distance shortage amount ME associated with an EPS delay caused by a time lag in the operation of the EPS 13, based on the vehicle body speed CV and the vehicle body acceleration CA.

In parallel with this calculation, the ECU 14 serves as the tire delay-associated movement distance calculating unit 203 to calculate the movement distance shortage amount MT associated with a tire delay caused by a time lag in an operation of changing the direction of the tires, based on the vehicle body speed CV.

At this time, it is necessary to synchronize the timings when the movement distance shortage amount ME and the movement distance shortage amount MT are calculated. That is, it is necessary to perform calculations for the movement distance under the same conditions (in a state where the vehicle 1 travels in the same conditions). More specifically, calculations have to be performed in synchronization with the same movement distance CL of the vehicle 1.

The reason for this is that if the calculated movement distance shortage amount ME and the calculated movement distance shortage amount MT correspond to different movement distances CL, correction directions become different from each other, the steering wheel moves unsmoothly, and a user is likely to feel discomfort.

Hereinafter, points, which have to be taken into consideration so as to realize functions of the ECU 14 as the tire delay-associated movement distance calculating unit 203, will be described.

Figure 11:
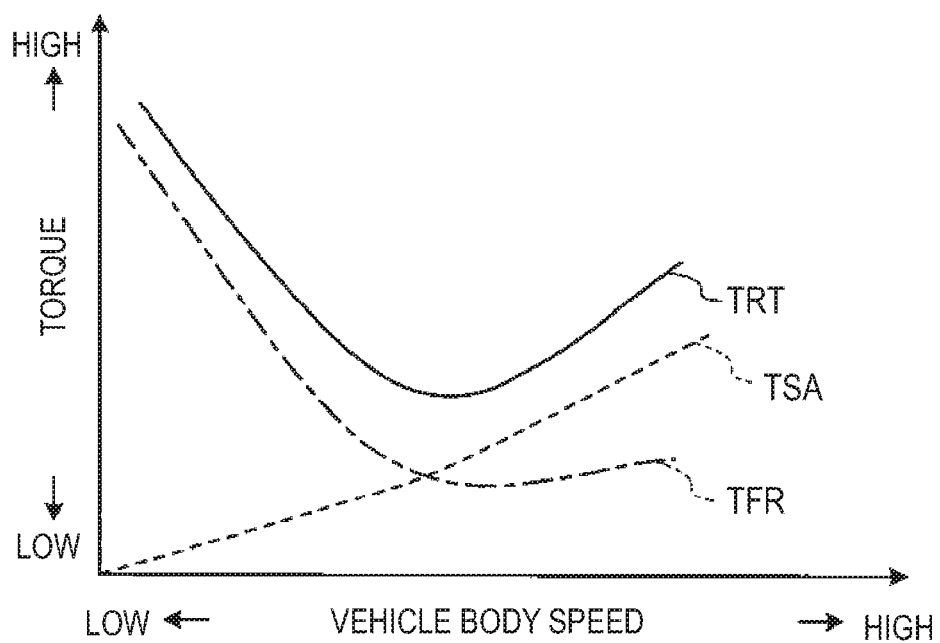
FIG. 11 is a graph illustrating torque between a road surface and tires.

FIG. 11 is a graph illustrating torque between a road surface and the tires.

As illustrated in FIG. 11, the magnitude of the total torque (tire torque TRT) between the road surface and the tires can be expressed as the sum of frictional torque TFR induced by a frictional force between the road surface and the tires and self-aligning torque TSA returning the steering wheel to its original position.

That is, when it comes to describing the frictional torque TFR, in a case where the vehicle body speed is low, the steering wheel feels heavy due to a frictional force between the road surface and the tires, and in a case where the vehicle body speed is high, the steering wheel feels light.

In contrast, when it comes to describing the self-aligning torque TSA, in a case where the vehicle body speed is low, a force returning the steering wheel to its original position is small, and a force returning the steering wheel to its original position increases as the vehicle body speed increases.

Accordingly, as illustrated in FIG. 10, a change curve of the tire torque TRT with respect to an increase in vehicle body speed is a U-shaped curve.

Figure 12:
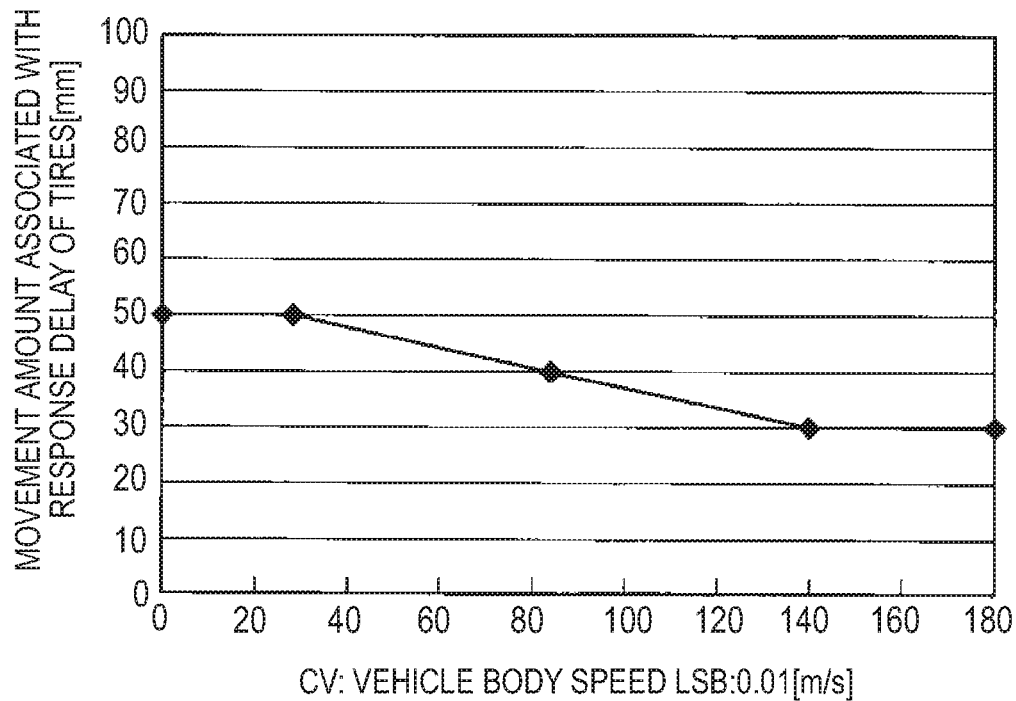
FIG. 12 is a graph illustrating a movement distance associated with a tire delay.

FIG. 12 is a graph illustrating a movement distance associated with a tire delay.

In the embodiment, there is a relationship between the tire torque TRT (generated between a road surface and the tires) and a movement amount associated with a tire response delay. For example, as illustrated in FIG. 12, the tire delay-associated movement distance shortage amount MT is set to 50 mm at a vehicle body speed of 28 cm/s or lower, the tire delay-associated movement distance shortage amount MT is set to 30 mm at a vehicle body speed of 140 cm/s or higher, the tire delay-associated movement distance shortage amount MT is set to a distance proportional to the vehicle body speed in a vehicle body speed range from 28 cm/s to 140 cm/s, and the tire delay-associated movement distance shortage amount MT is set to 40 mm at a vehicle body speed of 84 cm/s.

In this manner, it is possible to effectively cancel out a movement distance associated with a tire delay.

A movement distance associated with a tire delay when the turning angle of the steering wheel is increased is different from that when the turning angle of the steering wheel is decreased. That is, since the movement distance associated with a tire delay is small when the turning angle of the steering angle is decreased, a plurality of maps (data tables) may be provided such that the movement distance associated with a tire delay when the turning angle of the steering wheel is increased is different from that when the turning angle of the steering wheel is decreased, and a movement distance associated with a tire delay may switch between the plurality of maps.

Subsequently, the ECU 14 serves as the first addition unit 204 to add the movement distance shortage amount ME and the movement distance shortage amount MT to the movement distance CL, and to output the result as the route correction feedforward data RFF.

The ECU 14 serves as the second addition unit 205 to add the movement distance shortage amount MT to the movement distance CL, and to output the result as the route correction feedfack data RFB.

Subsequently, the ECU 14 serves as the first route correcting unit 207 to correct the set movement route data SR based on the route correction feedforward data RFF, and outputs the result as the first corrected route data CR1.

Subsequently, while referring to tables stored in the SSD 14f in advance, the ECU 14 serves as the first curvature/steering angle map 208 to output the first steering angle data WA1 which is steering angles into which the curvature of a route (a plurality of continuing arcs of a route) corresponding to the first corrected route data CR1 is converted.

That is, since the route corresponding to the first corrected route data CR1 is considered as a figure in which arcs (straight portions are considered to have r=∞) having different radii are connected to each other, the arcs are sequentially converted into corresponding steering angles, and the converted steering angles are output as the first steering angle data WA1.

Subsequently, the ECU 14 serves as the smoothing processing unit 209 to perform a smoothing process (low-pass filtering process) (in which the first steering angle data WA1 is corrected (interpolated)) such that steering angle changes according to the first steering angle data WA1 are smoothed, that is, such that the steering wheel (the steering section 4) moves smoothly, and to output the first smoothed steering angle data FWA1.

In contrast, the ECU 14 serves as the second route correcting unit 210 to correct the set movement route data SR based on the route correction feedback data RFB, and to output the result as the second corrected route data CR2.

Subsequently, while referring to tables stored in the SSD 14f in advance, the ECU 14 serves as the second curvature/steering angle map 211, and similar to the process of outputting the first steering angle data WA1, outputs the second steering angle data WA2 which is steering angles into which the curvature of a route (a plurality of continuing arcs of a route) corresponding to the second corrected route data CR2 is converted.

Subsequently, similar to the process performed by the smoothing processing unit 209, the ECU 14 serves as the smoothing processing unit 212 to perform a smoothing process (low-pass filtering process) such that steering angle changes according to the second steering angle data WA2 are smoothed, and to output the second smoothed steering angle data FWA2.

Subsequently, the ECU 14 serves as the subtraction unit 213 to calculate and output the deviation SB between the second smoothed steering angle data FWA2 and the steering angle data WA that is actually output by the EPS 13.

The ECU 14 serves as the PI control unit 214 to generate and output the feedback data FB for performing PI (proportional-integral) control on the steering angle data WA, based on the calculated deviation SB.

Subsequently, the ECU 14 serves as the third addition unit 215 to add the feedback data FB to the first smoothed steering angle data FWA1, and to output the result as the EPS control data EC that corresponds to a changed steering angle curve when parking assistance is activated.

The change amount adjusting unit 216 adjusts the amount of change of the EPS control data EC so as to suppress sharp steering angle changes such that the changes of the EPS control data EC do not cause deterioration in riding quality of occupants (including a driver) of the host vehicle, and the change amount adjusting unit 216 outputs the adjusted EPS control data ECC to the EPS 13.

Figure 13:
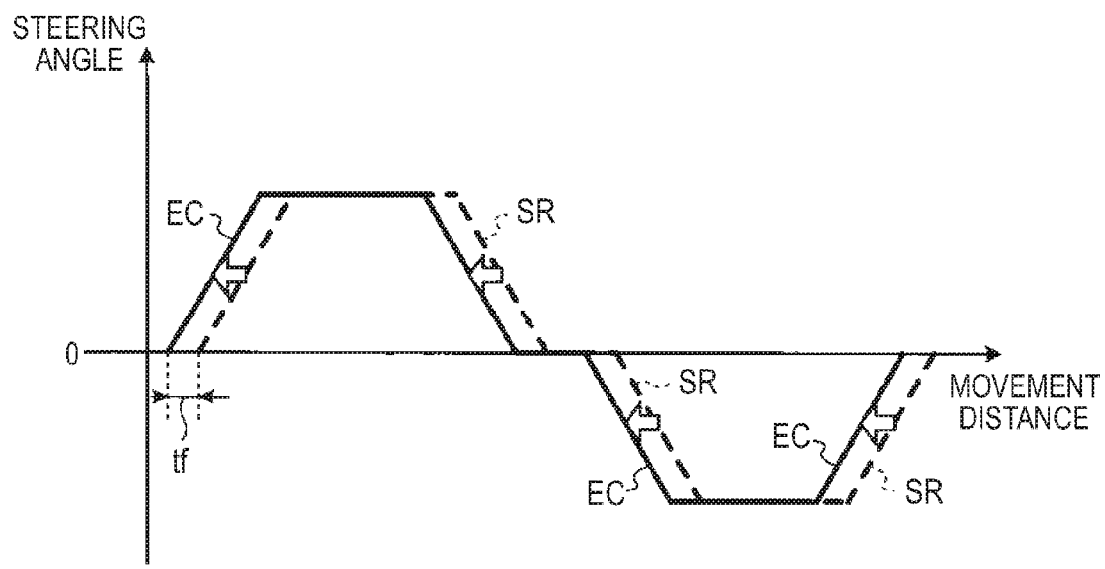
FIG. 13 is a graph illustrating the concept of EPS control data.

FIG. 13 is a graph illustrating the concept of EPS control data.

As illustrated in FIG. 13, the EPS control data EC is equivalent to a changed steering angle curve (advanced and changed target steering angle curve) that is a changed steering angle curve (changed target steering angle curve) which corresponds to the set movement route data SR equivalent to the target route RTX (refer to FIG. 10) of the vehicle 1 when parking assistance is activated which has been generated and output by the route planning unit 206, and the output of which has been advanced by a time tf (variable value) in anticipation of a response delay of the EPS 13 and a response delay of a tire angle.

That is, since the response delay of the EPS 13 and the response delay of the tire angle are taken into consideration when obtaining the EPS control data EC, control is performed such that the response delay of the EPS 13 and the response delay of the tire angle are effectively cancelled out. As a result, an actual route of the vehicle 1 may substantially coincide with the target route.

If the ECU 14 determines the target route RTX in Step S14, the ECU transits to parking assistance control (Step S15).

Figure 14:
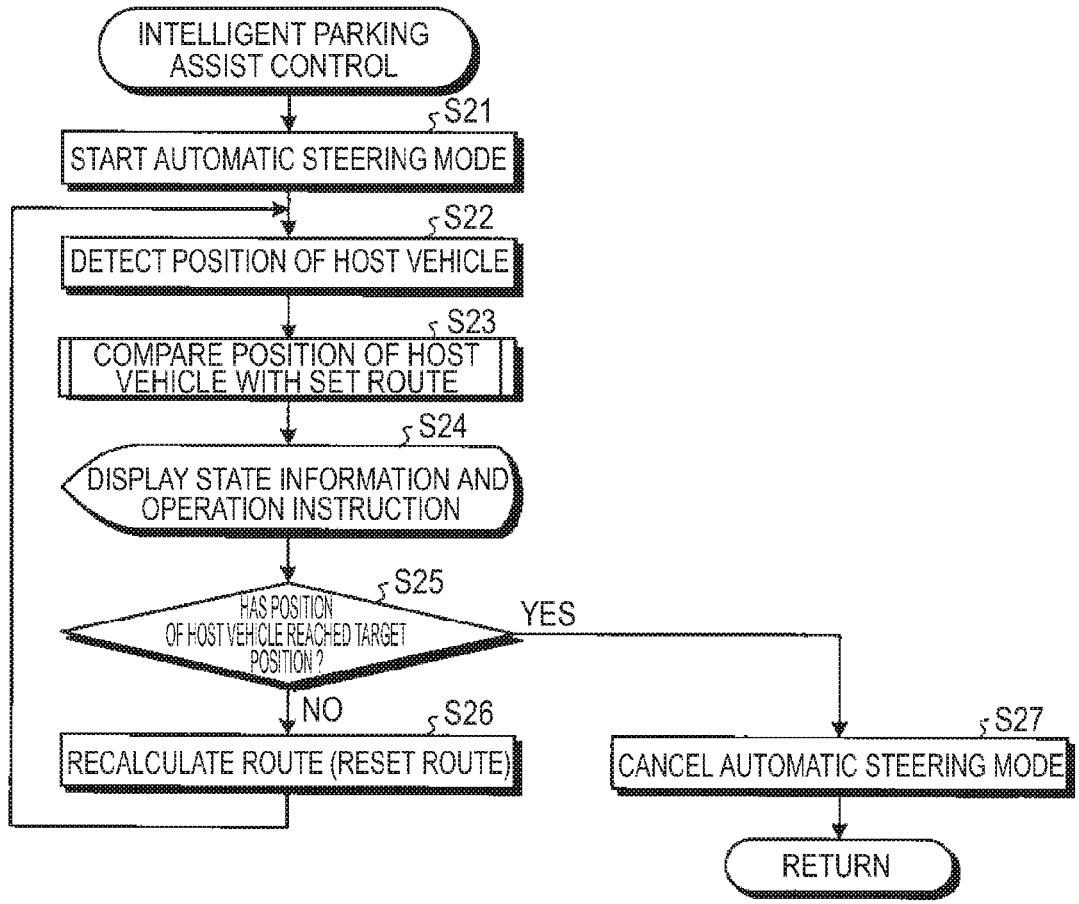
FIG. 14 is a process flow chart illustrating a parking assistance control process.

FIG. 14 is a process flow chart illustrating the parking assistance control process.

First, the ECU 14 starts an automatic steering mode in which automatic steering is performed, so as to control each part of the vehicle 1 such that the vehicle 1 moves to a target parking position (movement target position) along a movement route (Step S21).

In the automatic steering mode, it is not necessary for a driver to operate the steering section 4, specifically, to operate the steering wheel. A forward movement drive force and a rearward movement drive force of the vehicle 1 in the parking assistance control process are generated by creeping that allows a drive force of an engine to be transmitted to the vehicle 1 even if the driver does not press the accelerator pedal, that is, does not operate the acceleration operation section 5.

For this reason, the driver merely operates the brake pedal (the brake operation section 6) and the shift lever (the shift operation section 7) according to display on the display device 12.

Subsequently, a movement control unit 145 detects the position of the host vehicle (Step S22).

Specifically, the ECU 14 detects the position of the host vehicle by calculating the distance of the vehicle 1, which is the amount of movement from the initial position P1, and the direction of the vehicle 1 based on the amount of steering of the steering section 4 detected by the steering angle sensor 19, and a vehicle speed detected by the vehicle wheel speed sensor 22.

The ECU 14 compares the set route with the position of the host vehicle (Step S23). The ECU 14 serves as an output information determination unit 146 to determine information regarding the state of the vehicle and an operation instruction to the driver, and to display the state information and the operation instruction on the display device 12 (Step S24).

Figure 15:
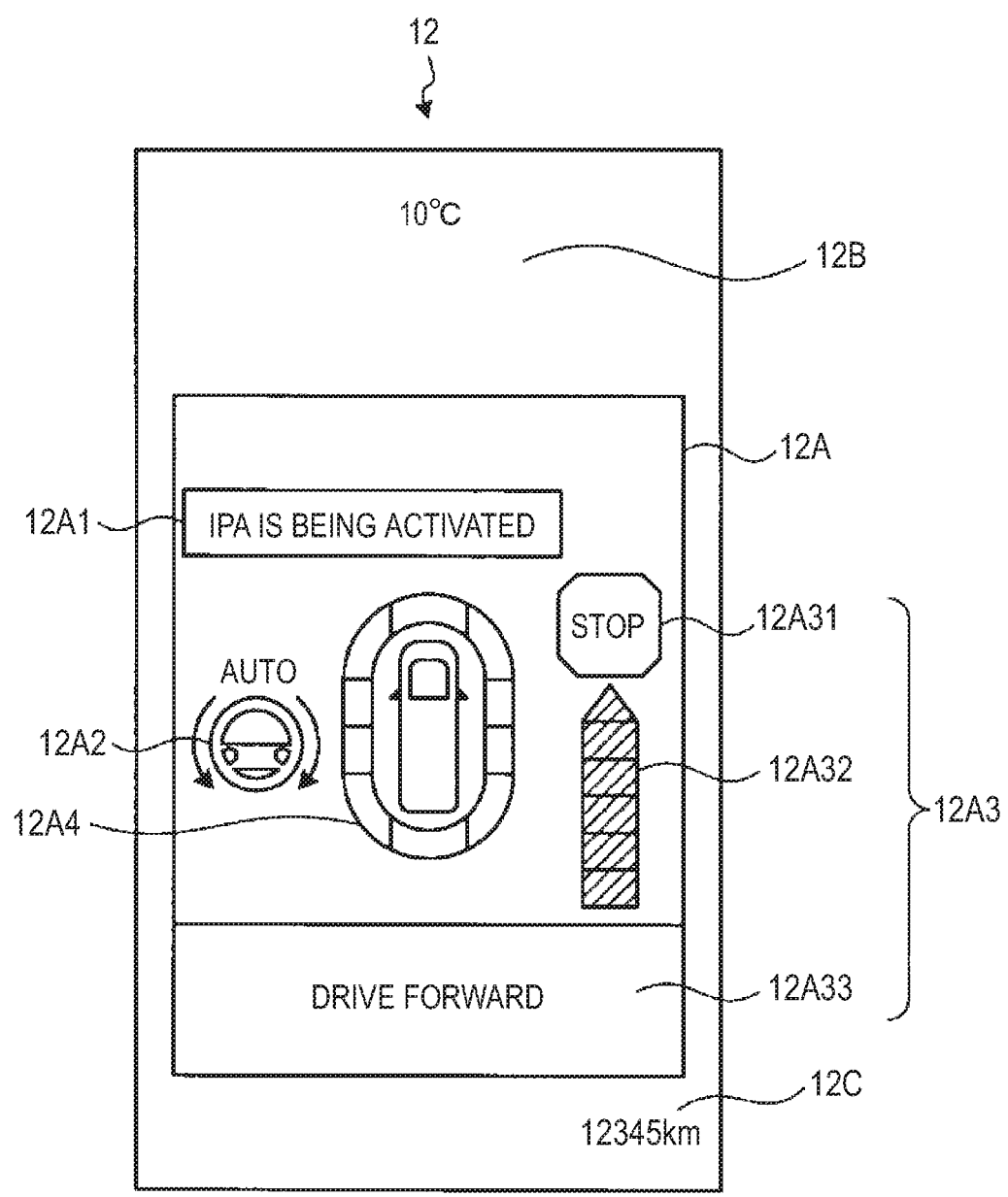
FIG. 15 is a view illustrating an example of display when the parking assistance control process is executed.

FIG. 15 is a view illustrating an example of display when the parking assistance control process is executed.

In broad classification, a display screen of the display device 12 includes a parking assistance information display area 12A that displays various information regarding parking assistance; a selected information display area 12B that displays various information selected in advance; and a travel distance information display area 12C that is capable of displaying information regarding an odometer or a trip meter.

The parking assistance information display area 12A includes a parking assistance display area 12A1 that displays a message indicating that intelligent parking assist (IPA) is being activated; an automatic steering symbol display area 12A2 that displays an automatic steering mode symbol indicating that an automatic steering mode is being activated; an operation instruction display area 12A3 that displays an operation instruction to a driver; and an obstacle display area 12A4 that displays the direction of the position of an obstacle in a case where the obstacle around the vehicle 1 is positioned in a predetermined distance range of the distance measuring units 16 and 17.

In this configuration, as illustrated in FIG. 15, the operation instruction display area 12A3 displays a brake operation symbol 12A31 that is turned on when an instruction on the operation of the brake (the brake operation section 6) has been issued, a distance reference symbol 12A32 that displays a reference of the distance to a reverse turning position of the steering wheel (the steering section 4) or a reference of the distance to a movement target position in such a manner that the distance reference symbol 12A32 gradually transits from a full turn-on state to a turn-off state, and an instruction display area 12A33 that displays the content of an instruction to a driver.

That is, in the case illustrated in FIG. 15, parking assistance is activated, an automatic steering mode is activated, approximately 100% the distance to the reverse turning position P2 of the steering wheel (the steering section 4) or the target parking position P3 (movement target position) still remains, and the content of an instruction to make a driver to stop pressing the brake pedal (the brake operation section 6) and to allow a forward movement by creeping is displayed.

Subsequently, the ECU 14 serves as the movement control unit 145 to determine whether the position of the host vehicle has reached the target parking position P3 which is a target position (Step S25).

In this case, it is determined in Step S25 that the position of the host vehicle has not yet reached the target parking position P3 which is a target position (Step S25: No), and thus, the ECU 14 serves again as a movement route determination unit 144 to recalculate and reset a movement route (Step S26).

The reason for this is to hold a movement route more optimized for actual situations because the tire torque TRT generated between a road surface and the tires changes depending on road surface conditions or the like, and the vehicle 1 does not necessarily move along the set target route RTX.

The process transitions to Step S22 again, and then the ECU 14 detects the position of the host vehicle (Step S22). The ECU 14 compares the set route with the position of the host vehicle (Step S23). The ECU 14 displays state information and instruction information regarding an operation on the display screen of the display device 12 (Step S24). If it is determined in Step S25 that the position of the host vehicle has reached the target parking position P3 which is a target position (Step S25: Yes), the ECU 14 cancels the automatic steering mode (Step S27), and terminates the parking assistance process while displaying the termination of the parking assistance process in the instruction display area 12A33.

Figure 16:
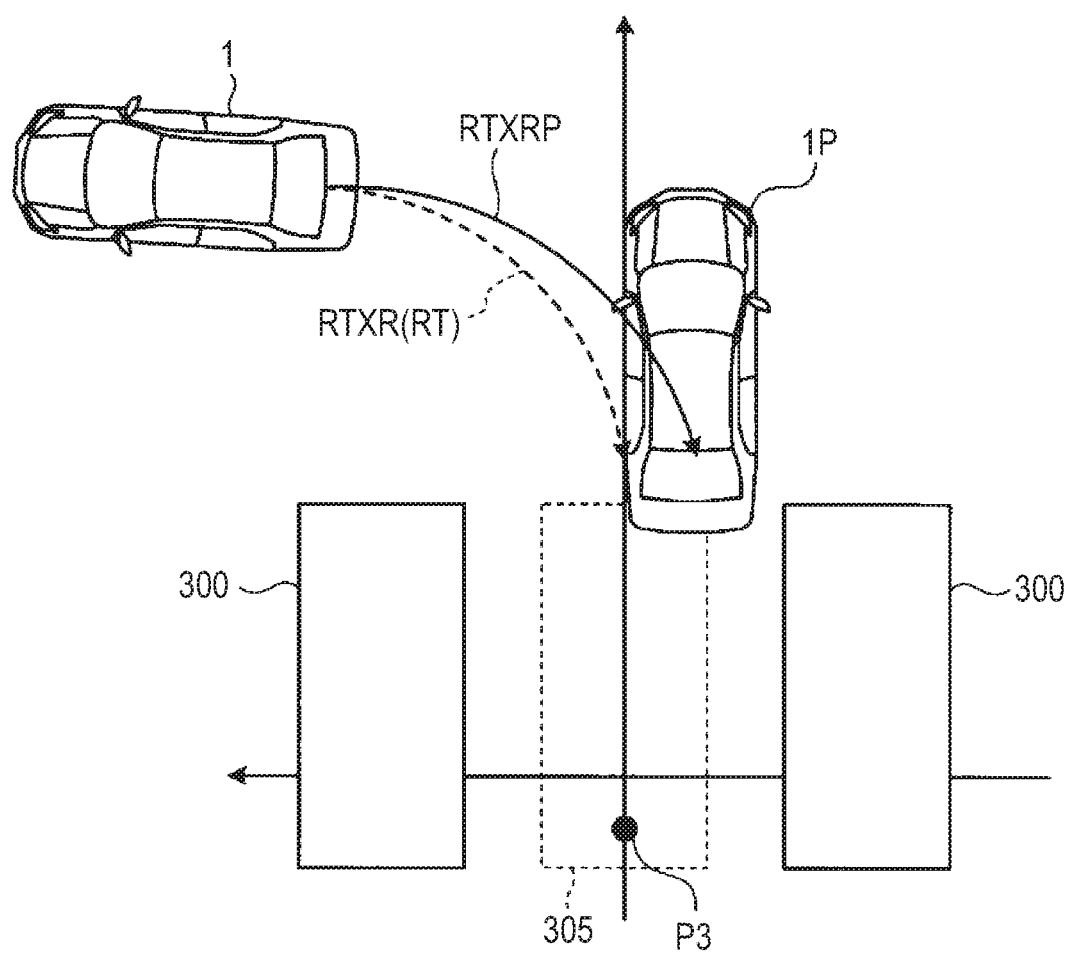
FIG. 16 is a view illustrating an effect of the first embodiment.

FIG. 16 is a view illustrating an effect of the first embodiment.

As illustrated in FIG. 16, according to the first embodiment, in a case where parking assistance is performed, even if a response delay of the EPS 13 is present, or the tire torque TRT generated between a road surface and the tires changes depending on road surface conditions or the like, an actual movement route RTXR of the vehicle 1 corresponding to the set target route RTX actually coincides with the target route RTX, and it is possible to reliably park the vehicle 1 at the movement target position 305 without causing a deviation of the parking position like an actual movement route RTXRP in the related art.

That is, it is possible to reliably perform parking assistance by preventing the occurrence of a deviation between the target route and the actual route which is caused by a response delay between the steering angle of the EPS 13 and an actual tire angle.

2. Second Embodiment

Figure 17:
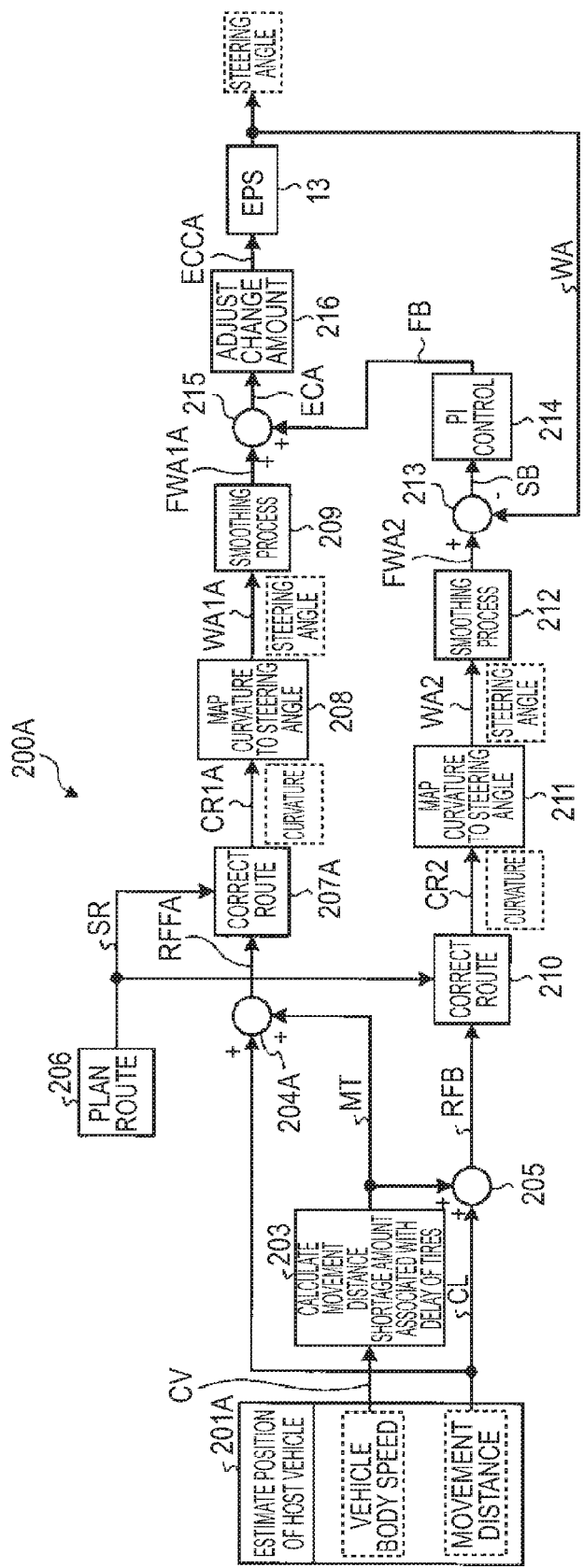
FIG. 17 is a block diagram illustrating the functional configuration of an EPS control function of the ECU in a second embodiment.

FIG. 17 is a block diagram illustrating the functional configuration of an EPS control function of the ECU in a second embodiment.

The EPS control function in FIG. 17 is different from that of the first embodiment in FIG. 5 in that a feedforward process relating to a response delay of the EPS 13 is not performed.

The same reference signs will be assigned to the same portions in FIG. 17 as those in FIG. 5. As illustrated in FIG. 17, an EPS control function 200A of the ECU 14 in the second embodiment includes a host vehicle position estimating unit 201A that outputs the vehicle body speed CV and the movement distance (movement distance of the vehicle while parking assistance is activated) CL when parking assistance is activated; the tire delay-associated movement distance calculating unit 203 that calculates the movement distance shortage amount MT associated with a tire delay caused by a time lag in an operation of changing the direction of the tires, based on the vehicle body speed CV; and a first addition unit 204A that adds the movement distance shortage amount MT to the movement distance CL, and outputs the result as route correction feedforward data RFFA.

The EPS control function 200A includes the second addition unit 205 that adds the movement distance shortage amount MT to the movement distance CL, and outputs the result as the route correction feedback data RFB; the route planning unit 206 that sets a movement route of the vehicle 1 when parking assistance is activated, and outputs the movement route as the set movement route data SR; a first route correcting unit 207A that corrects the set movement route data SR based on the route correction feedforward data RFF, and outputs the result as first corrected route data CR1A; the first curvature/steering angle map 208 that outputs first steering angle data WA1A which is steering angles into which the curvature of a route corresponding to the first corrected route data CR1 is converted; and the smoothing processing unit 209 which performs a smoothing process (low-pass filtering process) such that steering angle changes according to the first steering angle data WA1A are smoothed, and which outputs first smoothed steering angle data FWA1A.

The EPS control function 200A includes the second route correcting unit 210 that corrects the set movement route data SR based on the route correction feedback data RFB, and outputs the result as the second corrected route data CR2; the second curvature/steering angle map 211 that outputs the second steering angle data WA2 which is steering angles into which the curvature of a route corresponding to the second corrected route data CR2 is converted; and the smoothing processing unit 212 which performs a smoothing process (low-pass filtering process) such that steering angle changes according to the second steering angle data WA2 are smoothed, and which outputs the second smoothed steering angle data FWA2.

The EPS control function 200A includes the subtraction unit 213 that calculates and outputs the deviation SB between the second smoothed steering angle data FWA2 and the steering angle data WA that is actually output by the EPS 13; the PI control unit 214 that generates and outputs the feedback data FB for performing PI (proportional-integral) control on the steering angle data WA, based on the deviation SB; the third addition unit 215 that adds the feedback data FB to the first smoothed steering angle data FWA1, and outputs the result as EPS control data ECA; and the change amount adjusting unit 216 which adjusts the amount of change of the EPS control data ECA so as to suppress sharp steering angle changes such that the changes of the EPS control data ECA do not cause deterioration in riding quality of occupants (including a driver) of the host vehicle, and which outputs adjusted EPS control data ECCA to the EPS 13.

According to the second embodiment, it is not possible to reduce the influence of a response delay of the EPS 13 to some extent in comparison to that of the first embodiment; however, it is possible to reliably perform parking assistance by preventing the occurrence of a deviation between a target route and an actual route which is caused by a response delay between the steering angle of the EPS 13 and an actual tire angle.

3. Third Embodiment

Figure 18:
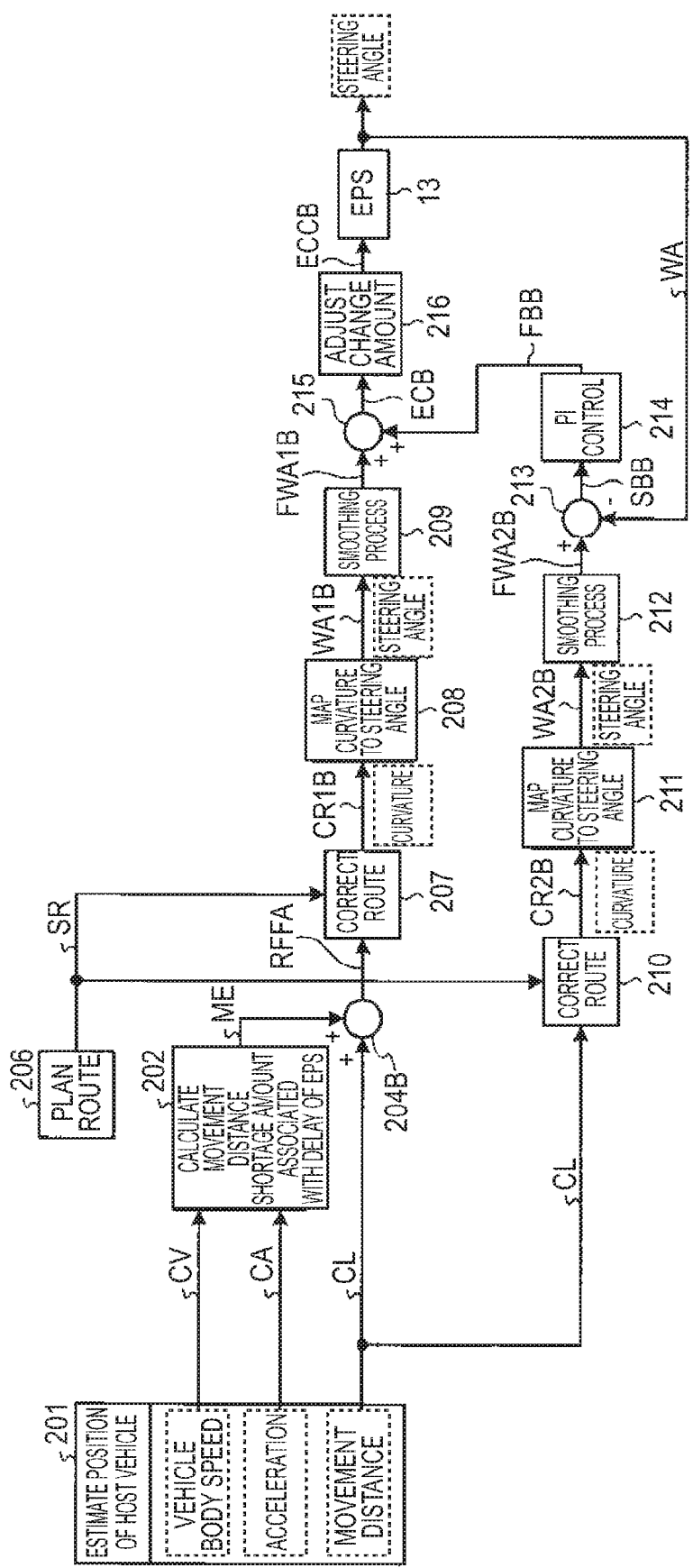
FIG. 18 is a block diagram illustrating the functional configuration of an EPS control function of the ECU in a third embodiment.

FIG. 18 is a block diagram illustrating the functional configuration of an EPS control function of the ECU in a third embodiment.

The EPS control function in FIG. 18 is different from that of the first embodiment in FIG. 5 in that a feedforward process and a feedback process relating to a tire delay caused by a time lag in an operation of changing the direction of the tires are not performed.

The same reference signs will be assigned to the same portions in FIG. 18 as those in FIG. 5.

As illustrated in FIG. 18, an EPS control function 200B of the ECU 14 in the third embodiment includes the host vehicle position estimating unit 201 that outputs the vehicle body speed CV, the vehicle body acceleration CA, and the movement distance CL when parking assistance is activated; the EPS delay-associated movement distance calculating unit 202 that calculates the movement distance shortage amount ME associated with an EPS delay caused by a time lag in the operation of the EPS 13, based on the vehicle body speed CV and the vehicle body acceleration CA; the tire delay-associated movement distance calculating unit 203 that calculates the movement distance shortage amount MT associated with a tire delay caused by a time lag in an operation of changing the direction of the tires, based on the vehicle body speed CV; and the first addition unit 204 that adds the movement distance shortage amount ME to the movement distance CL, and outputs the result as route correction feedforward data RFFB.

The EPS control function 200B includes the route planning unit 206 that sets a movement route of the vehicle 1 when parking assistance is activated, and outputs the movement route as the set movement route data SR; the first route correcting unit 207 that corrects the set movement route data SR based on the route correction feedforward data RFFB, and outputs the result as first corrected route data CR1B; the first curvature/steering angle map 208 that outputs first steering angle data WA1B which is steering angles into which the curvature of a route corresponding to the first corrected route data CR1B is converted; and the smoothing processing unit 209 which performs a smoothing process (low-pass filtering process) such that steering angle changes according to the first steering angle data WA1B are smoothed, and which outputs first smoothed steering angle data FWA1B.

The EPS control function 200B includes the second route correcting unit 210 that corrects the set movement route data SR based on the movement distance CL, and outputs the result as second corrected route data CR2B; the second curvature/steering angle map 211 that outputs second steering angle data WA2B which is steering angles into which the curvature of a route corresponding to the second corrected route data CR2B is converted; and the smoothing processing unit 212 which performs a smoothing process (low-pass filtering process) such that steering angle changes according to the second steering angle data WA2B are smoothed, and which outputs second smoothed steering angle data FWA2B.

The EPS control function 200B includes the subtraction unit 213 that calculates and outputs a deviation SBB between the second smoothed steering angle data FWA2B and the steering angle data WA that is actually output by the EPS 13; the PI control unit 214 that generates and outputs feedback data FBB for performing PI (proportional-integral) control on the steering angle data WA, based on the deviation SBB; the third addition unit 215 that adds the feedback data FBB to the first smoothed steering angle data FWA1B, and outputs the result as EPS control data ECB; and the change amount adjusting unit 216 which adjusts the amount of change of the EPS control data ECB so as to suppress sharp steering angle changes such that the changes of the EPS control data ECB do not cause deterioration in riding quality of occupants (including a driver) of the host vehicle, and which outputs adjusted EPS control data ECCB to the EPS 13.

According to the third embodiment, it is not possible to reduce an influence of tire delay, which is caused by a time lag in an operation of changing the direction of the tires, to some extent in comparison to that of the first embodiment; however, it is possible to reliably perform parking assistance by preventing the occurrence of a deviation between a target route and an actual route which is caused by a response delay between the steering angle of the EPS 13 and an actual tire angle.

4. Modification Examples of Embodiments

The embodiments of this disclosure have been described. The embodiments are given as examples, and are not intended to limit the scope of this disclosure. New embodiments can be realized in various other forms, and omissions, replacements, and changes can be made to the embodiments in various forms insofar as the omissions, the replacements, and the changes do not depart from the concept of this disclosure. The embodiments and the modifications are contained in the scope and concept of this disclosure, and particularly, are contained in the appended claims and equivalent scope thereof.

For example, parking assistance in driving forward guidance and perpendicular reverse parking has been described above, and similarly, this disclosure can be applied to other methods of driving into or out of a parking area (in this application, the parking assistance includes assisting in driving out of a parking area).

Figure 19:
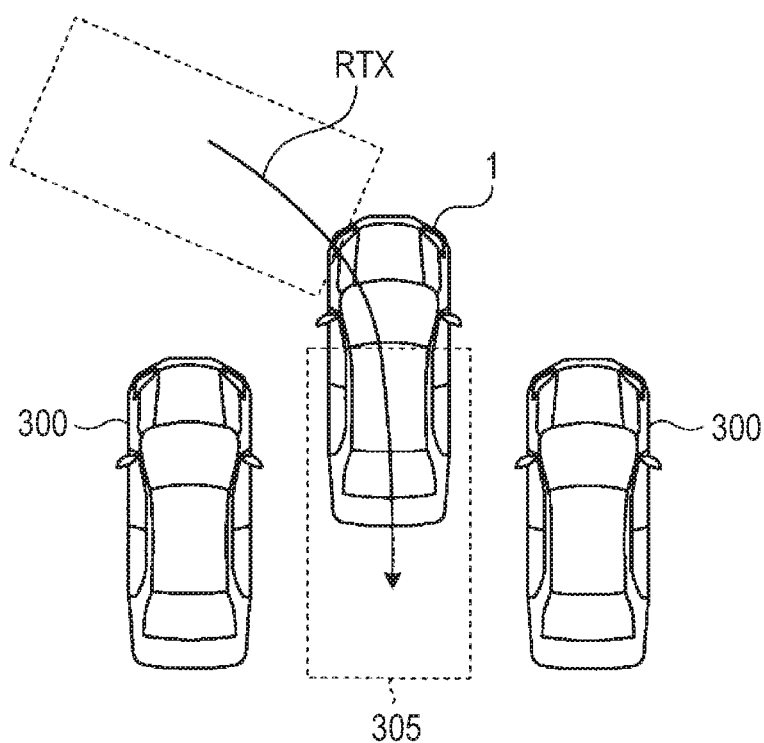
FIG. 19 is a view illustrating parking assistance in perpendicular reverse parking.

FIG. 19 is a view illustrating parking assistance in perpendicular reverse parking.

Figure 20:
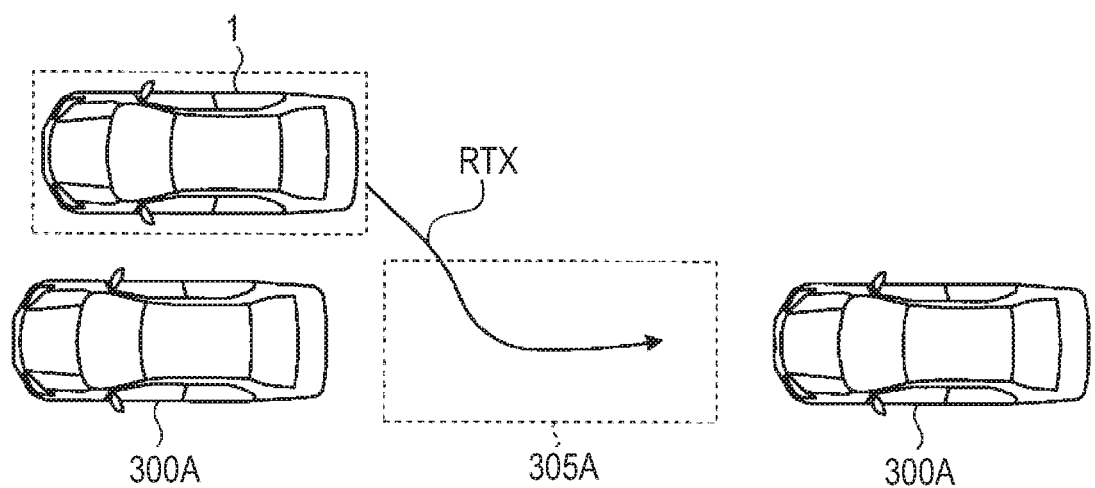
FIG. 20 is a view illustrating parking assistance in parallel reverse parking.

FIG. 20 is a view illustrating parking assistance in parallel reverse parking.

Figure 21:
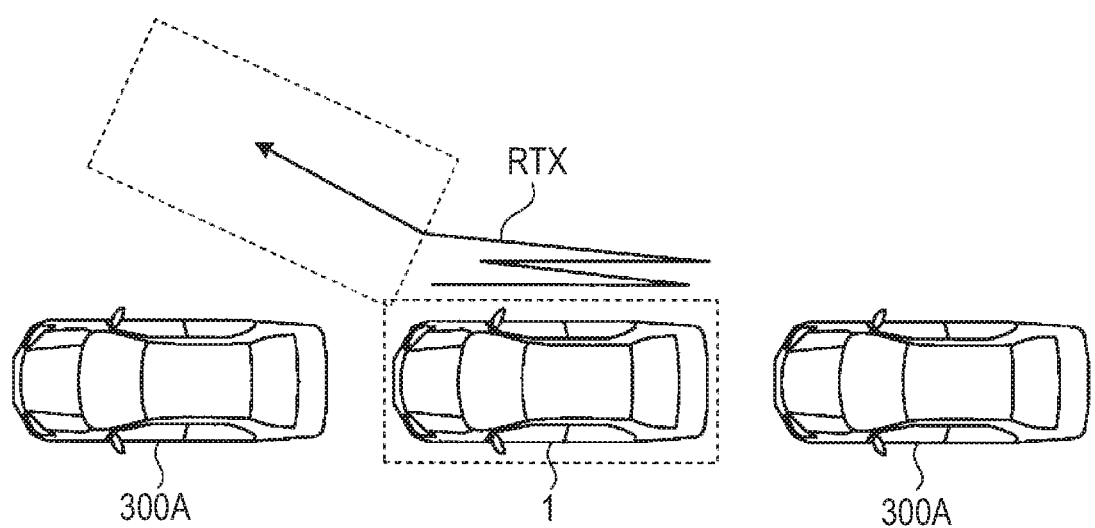
FIG. 21 is a view illustrating assisting in driving forward out of parallel parking.

FIG. 21 is a view illustrating assisting in driving forward out of parallel parking.

This disclosure can be applied to perpendicular reverse parking illustrated in FIG. 19, parallel reverse parking illustrated in FIG. 20, and driving forward out of parallel parking illustrated in FIG. 21.

Also, in these cases, in order to correct errors between the target route RTX, which is determined by the arrangement of other vehicles 300 and 300A or the like, and an actual travel route of the vehicle 1 affected by a response delay of the EPS 13, a response delay between the steering angle of the EPS 13 and an actual tire angle, and the like, a route from the current position of the vehicle 1 to a target parking position or a target drive-out position is recalculated at predetermined frequencies.

In this case, since parking patterns or drive-out patterns differently affect a deviation between the target route and the actual travel route even at the same vehicle body speed, preferably, a curvature/steering angle map is held for each pattern, and the curvature/steering angle maps are switched and applied.

There is a concern that if the number of times of recalculating a route is high, a user may feel discomfort; however, also in the modification examples, it is possible to improve route traceability when parking assistance is activated or when drive-out assist is activated by taking into consideration a response delay of the EPS 13 and a response delay between the steering angle of the EPS 13 and an actual tire angle, and comfortable parking assistance (drive-out assist) is performed for a user by reducing the number of times of recalculation.

In addition, in this configuration, it is possible to omit a recalculation process for recalculating a set route, or to reduce the burden of a recalculation process. A delay in the operation of the vehicle 1 required for parking assistance is reduced, and parking into or driving out of a parking area is promptly performed.

A parking assistance device according to an aspect of this disclosure includes: a setting unit that sets a movement route of a vehicle with an electric power steering when parking assistance is activated in the vehicle; a generation unit that generates control data equivalent to a changed steering angle curve which has taken into consideration a response delay between the output steering angle of the electric power steering and an actual tire angle in advance, based on the set movement route; and a control unit that controls the electric power steering based on the control data.

In this configuration, parking assistance is reliably performed by preventing the occurrence of a deviation between a target route and an actual route which is caused by a response delay between the steering angle of the electric power steering and an actual tire angle.

In the parking assistance device according to the aspect of this disclosure, the generation unit may include a tire angle delay calculating unit that calculates a movement distance shortage amount of the vehicle which is caused by the response delay of the tire angle, based on a vehicle body speed of the vehicle, and a data generation unit that generates the control data based on the set movement route, a movement distance of the vehicle after the movement of the vehicle has been started by the parking assistance, and the movement distance shortage amount of the vehicle which is caused by the response delay of the tire angle.

In this configuration, control data equivalent to a changed steering angle curve is generated based on a movement distance of the vehicle after the movement of the vehicle has been started by parking assistance, and a movement distance shortage amount of the vehicle which is caused by a response delay of a tire angle corresponding to a vehicle body speed. As a result, it is possible to prevent the occurrence of a deviation between a target route and an actual rote according to an actual movement state of the vehicle.

The generation unit may include a steering delay calculating unit that calculates a movement distance shortage amount of the vehicle which is caused by a response delay of the electric power steering, based on a vehicle body speed of the vehicle and acceleration of the vehicle. The data generation unit may generate the control data based on the set movement route, the movement distance of the vehicle after the movement of the vehicle has been started by the parking assistance, the movement distance shortage amount of the vehicle which is caused by the response delay of the electric power steering, and the movement distance shortage amount which is caused by the response delay of the tire angle.

In this configuration, it is possible to further prevent the occurrence of a deviation between a target route and an actual route which is caused by a response delay of the electric power steering and a response delay of a tire angle.

The data generation unit may generate the control data using the movement distance shortage amount of the vehicle which is caused by the response delay of the electric power steering, and the movement distance shortage amount of the vehicle which is caused by the response delay of the tire angle, both of which are calculated in a state where the vehicle travels in the same conditions.

In this configuration, an operation of correcting a deviation between a target route and an actual route which is caused by a response delay of the electric power steering does not conflict with an operation of correcting a deviation between the target route and the actual route which is caused by a response delay of a tire angle. As a result, it is possible to move the vehicle smoothly, and parking assistance is performed without causing a user to feel discomfort.

The tire angle delay calculating unit may calculate the movement distance shortage amount of the vehicle which is caused by the response delay of the tire angle, based on a relationship between tire torque, which is generated between a road surface and tires, and a movement distance shortage amount associated with a response delay of the tires.

In this configuration, it is possible to prevent the occurrence of a deviation between an actual route and a target route optimized according to tire torque corresponding to a vehicle body speed.

The generation unit may include a steering delay calculating unit that calculates a movement distance shortage amount of the vehicle which is caused by a response delay of the electric power steering, based on a vehicle body speed of the vehicle and acceleration of the vehicle, and a data generation unit that generates the control data based on the set movement route, a movement distance of the vehicle after the movement of the vehicle has been started by the parking assistance, and the movement distance shortage amount of the vehicle which is caused by the response delay of the electric power steering.

In this configuration, control data equivalent to a changed steering angle curve is generated based on a movement distance of the vehicle after the movement of the vehicle has been started by parking assistance, and a movement distance shortage amount of the vehicle which is caused by a response delay of the electric power steering. As a result, it is possible to prevent the occurrence of a deviation between a target route and an actual rote according to an actual movement state of the vehicle.

The generation unit may include a plurality of curvature/steering angle maps which correspond to movement routes of the vehicle according to parking patterns. The generation unit may switch between the curvature/steering angle maps according to a parking pattern, and generate control data equivalent to the changed steering angle curve.

In this configuration, it is possible to optimally prevent the occurrence of a deviation between a target route and an actual route via optimization to a parking pattern.

A method according to another aspect of this disclosure is executed by a parking assistance device that assists a driver in parking a vehicle with an electric power steering, the method including the steps of: setting a movement route of the vehicle when the parking assistance is activated; generating control data equivalent to a changed steering angle curve which has taken into consideration a response delay between the output steering angle of the electric power steering and an actual tire angle in advance, based on the set movement route; and controlling the electric power steering based on the control data.

In this configuration, parking assistance is reliably performed by preventing the occurrence of a deviation between a target route and an actual route which is caused by a response delay between the steering angle of the electric power steering and an actual tire angle.

A program according to still another aspect of this disclosure causes a computer to control a parking assistance device that assists a driver in parking a vehicle with an electric power steering, the program causing the computer to serve as means for setting a movement route of the vehicle when parking assistance is activated; means for generating control data equivalent to a changed steering angle curve which has taken into consideration a response delay between the output steering angle of the electric power steering and an actual tire angle in advance, based on the set movement route; and means for controlling the electric power steering based on the control data.

In this configuration, parking assistance is reliably performed by preventing the occurrence of a deviation between a target route and an actual route which is caused by a response delay between the steering angle of the electric power steering and an actual tire angle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
a setting unit configured to set a movement route of a vehicle with an electric power steering when parking assistance is activated in the vehicle;
a generation unit configured to generate control data equivalent to a changed steering angle curve which has taken into consideration a response delay between the output steering angle of the electric power steering and an actual tire angle in advance, based on the set movement route, the generation unit including
a tire angle delay calculating unit configured to calculate a movement distance shortage amount of the vehicle which is caused by the response delay of the tire angle, based on a vehicle body speed of the vehicle,
a steering delay calculating unit configured to calculate a movement distance shortage amount of the vehicle which is caused by a response delay of the electric power steering, based on the vehicle body speed of the vehicle and acceleration of the vehicle, and
a data generation unit configured to generate the control data based on the set movement route, a movement distance of the vehicle after the movement of the vehicle has been started by the parking assistance, the movement distance shortage amount of the vehicle which is caused by the response delay of the electric power steering, and the movement distance shortage amount of the vehicle which is caused by the response delay of the tire angle; and
a control unit configured to control the electric power steering based on the control data,
wherein the movement distance shortage amount of the vehicle which is caused by the response delay of the electric power steering and the movement distance shortage amount of the vehicle which is caused by the response delay of the tire angle are both calculated in a state where the vehicle travels in the same conditions.

2. The parking assistance device according to claim 1, wherein the tire angle delay calculating unit is configured to calculate the movement distance shortage amount of the vehicle which is caused by the response delay of the tire angle, based on a relationship between tire torque, which is generated between a road surface and tires, and a movement distance shortage amount associated with a response delay of the tires.

3. The parking assistance device according to claim 1,
wherein the generation unit includes a plurality of curvature/steering angle maps which correspond to movement routes of the vehicle according to a plurality parking patterns, and
wherein the generation unit is configured to switch between the curvature/steering angle maps according to a parking pattern of the plurality of parking patterns, and to generate the control data equivalent to the changed steering angle curve.

4. A method which is executed by a parking assistance device that assists a driver in parking a vehicle with an electric power steering, the method comprising the steps of:
setting a movement route of the vehicle when the parking assistance is activated;
generating control data equivalent to a changed steering angle curve which has taken into consideration a response delay between the output steering angle of the electric power steering and an actual tire angle in advance, based on the set movement route, the generating control data includes
calculating a movement distance shortage amount of the vehicle which is caused by the response delay of the tire angle, based on a vehicle body speed of the vehicle,
calculating a movement distance shortage amount of the vehicle which is caused by a response delay of the electric power steering, based on a vehicle body speed of the vehicle and acceleration of the vehicle, and
generating the control data based on the set movement mute, a movement distance of the vehicle after the movement of the vehicle has been started by the parking assistance, the movement distance shortage amount of the vehicle which is caused by the response delay of the electric power steering and the movement distance shortage amount of the vehicle which is caused by the response delay of the tire angle; and
controlling the electric power steering based on the control data,
wherein the movement distance shortage amount of the vehicle which is caused by the response delay of the electric power steering and the movement distance shortage amount of the vehicle which is caused by the response delay of the tire angle are both calculated in a state where the vehicle travels in the same conditions.

5. A non-transitory computer readable medium storing program for causing a computer to control a parking assistance device that assists a driver in parking a vehicle with an electric power steering, the program causing the computer to serve as:
means for setting a movement route of the vehicle when parking assistance is activated;
means for generating control data equivalent to a changed steering angle curve which has taken into consideration a response delay between the output steering angle of the electric power steering and an actual tire angle in advance, based on the set movement route, wherein a movement distance shortage amount of the vehicle which is caused by the response delay of the tire angle is calculated based on a vehicle body speed of the vehicle, a movement distance shortage amount of the vehicle which is caused by a response delay of the electric power steering is calculated based on the vehicle body speed of the vehicle and acceleration of the vehicle, and the control data is generated based on the set movement route, a movement distance of the vehicle after the movement of the vehicle has been started by the parking assistance, the movement distance shortage amount of the vehicle which is caused by the response delay of the electric power steering, and the movement distance shortage amount of the vehicle which is caused by the response delay of the tire angle; and
means for controlling the electric power steering based on the control data,
wherein the movement distance shortage amount of the vehicle which is caused by the response delay of the electric power steering and the movement distance shortage amount of the vehicle which is caused by the response delay of the tire angle are both calculated in a state where the vehicle travels in the same conditions.

6. The method of claim 4,
wherein the calculating the movement distance shortage amount of the vehicle which is caused by the response delay of the tire angle includes calculating the movement distance shortage amount of the vehicle which is caused by the response delay of the tire angle based on a relationship between tire torque, which is generated between a road surface and tires, and a movement distance shortage amount associated with a response delay of the tires.

7. The non-transitory computer readable medium of claim 5,
wherein the program further causes the computer to serve as the means for generating the control data by causing the computer to serve as a means for calculating the movement distance shortage amount of the vehicle which is caused by the response delay of the tire angle based on a relationship between tire torque, which is generated between a road surface and tires, and a movement distance shortage amount associated with a response delay of the tires.

8. The method of claim 4,
wherein the generating control data further includes switching between curvature/steering angle maps according to a parking pattern of a plurality of parking patterns, wherein the maps correspond to movement routes of the vehicle according to the plurality of parking patterns.

9. The non-transitory computer readable medium of claim 5,
wherein the program further causes the computer to serve as the means for generating the control data by causing the computer to serve as a means for switching between curvature/steering angle maps according to a parking pattern of a plurality of parking patterns, wherein the curvature/steering angle maps correspond to movement routes of the vehicle according to the plurality of parking patterns.

10. The parking assistance device according to claim 1, wherein the data generation unit is further configured to generate the control data based on feedback data based on a deviation between first steering angle data and second steering angle data, wherein
the first steering angle data is based on the movement distance of the vehicle after the movement of the vehicle has been started by the parking assistance, the movement distance shortage amount of the vehicle which is caused by the response delay of the electric power steering, and the movement distance shortage amount of the vehicle which is caused by the response delay of the tire angle, and the second steering angle data is based on only one of the movement distance shortage amount of the vehicle which is caused by the response delay of the electric power steering and the movement distance shortage amount of the vehicle which is caused by the response delay of the tire angle.

11. The parking assistance device according to claim 10, wherein the second steering angle data is based on the movement distance shortage amount of the vehicle which is caused by the response delay of the tire angle.

\* \* \* \* \*